United States Patent [19]
Ohguro et al.

[11] Patent Number: 5,748,873
[45] Date of Patent: May 5, 1998

[54] FAULT RECOVERING SYSTEM PROVIDED IN HIGHLY RELIABLE COMPUTER SYSTEM HAVING DUPLICATED PROCESSORS

[75] Inventors: Hiroshi Ohguro, Hadano; Koichi Ikeda, Machida; Takaaki Nishiyama; Hiroshi Iwamoto, both of Hadano; Kenichi Kurosawa, Hitachi; Tetsuaki Nakamikawa, Hitachi; Michio Morioka, Hitachi, all of Japan

[73] Assignee: Hitachi, Ltd., Tokyo, Japan

[21] Appl. No.: 686,486

[22] Filed: Jul. 26, 1996

Related U.S. Application Data

[63] Continuation of Ser. No. 630,023, Apr. 9, 1996, abandoned, which is a continuation of Ser. No. 123,857, Sep. 17, 1993, abandoned.

[30] Foreign Application Priority Data

Sep. 17, 1992 [JP] Japan ................ 4-248133
Mar. 17, 1993 [JP] Japan ................ 5-056777

[51] Int. Cl.⁶ .................................... G06F 11/34
[52] U.S. Cl. ................ 395/182.09; 395/183.01; 395/181; 395/182.08; 371/47.1
[58] Field of Search ............... 395/180, 182.09, 395/182.1, 185.05, 183.01, 181, 182.08; 371/21.1, 68.3, 47.1

[56] References Cited

U.S. PATENT DOCUMENTS

| | | | |
|---|---|---|---|
| 3,898,621 | 8/1975 | Zelinski et al. | 340/172.5 |
| 4,907,228 | 3/1990 | Bruckert et al. | 371/68.3 |
| 4,954,942 | 9/1990 | Masuda et al. | 364/200 |
| 4,984,234 | 1/1991 | Vergnaud et al. | 370/58.1 |
| 5,005,174 | 4/1991 | Bruckert et al. | 371/68.3 |
| 5,136,204 | 8/1992 | Danielsen et al. | 395/575 |
| 5,255,367 | 10/1993 | Bruckert et al. | 395/200 |
| 5,278,962 | 1/1994 | Masuda et al. | 395/400 |

FOREIGN PATENT DOCUMENTS

| | | |
|---|---|---|
| 2-47731 | 2/1990 | Japan. |
| 3-175538 | 7/1991 | Japan. |
| 3-217944 | 9/1991 | Japan. |

Primary Examiner—Phung Chung
Attorney, Agent, or Firm—Antonelli, Terry, Stout, & Kraus, LLP

[57] ABSTRACT

A highly reliable computer system is intended to duplicate processors, compare the outputs of the processors with each other and enhance the validity of the output of processor system. If a mismatch between the outputs is detected, one of the processors performs a process of saving an internal state of the processor in a main memory and diagnosing factor of the detected mismatch. If the process is recognized to be continued in a duplex mode, the processors are re-synchronized by a processor reset, and initialize themselves and restore the internal information saved in the main memory for continuing the process having been proceeded before the fault occurred.

26 Claims, 29 Drawing Sheets

FIG. I

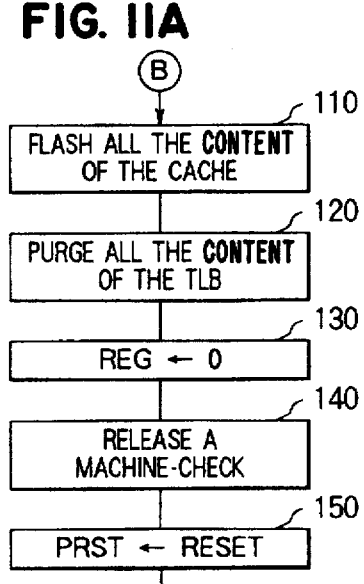
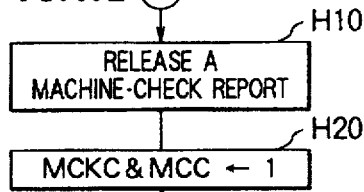
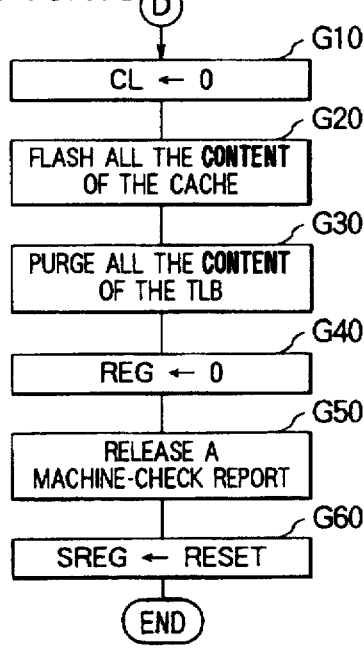
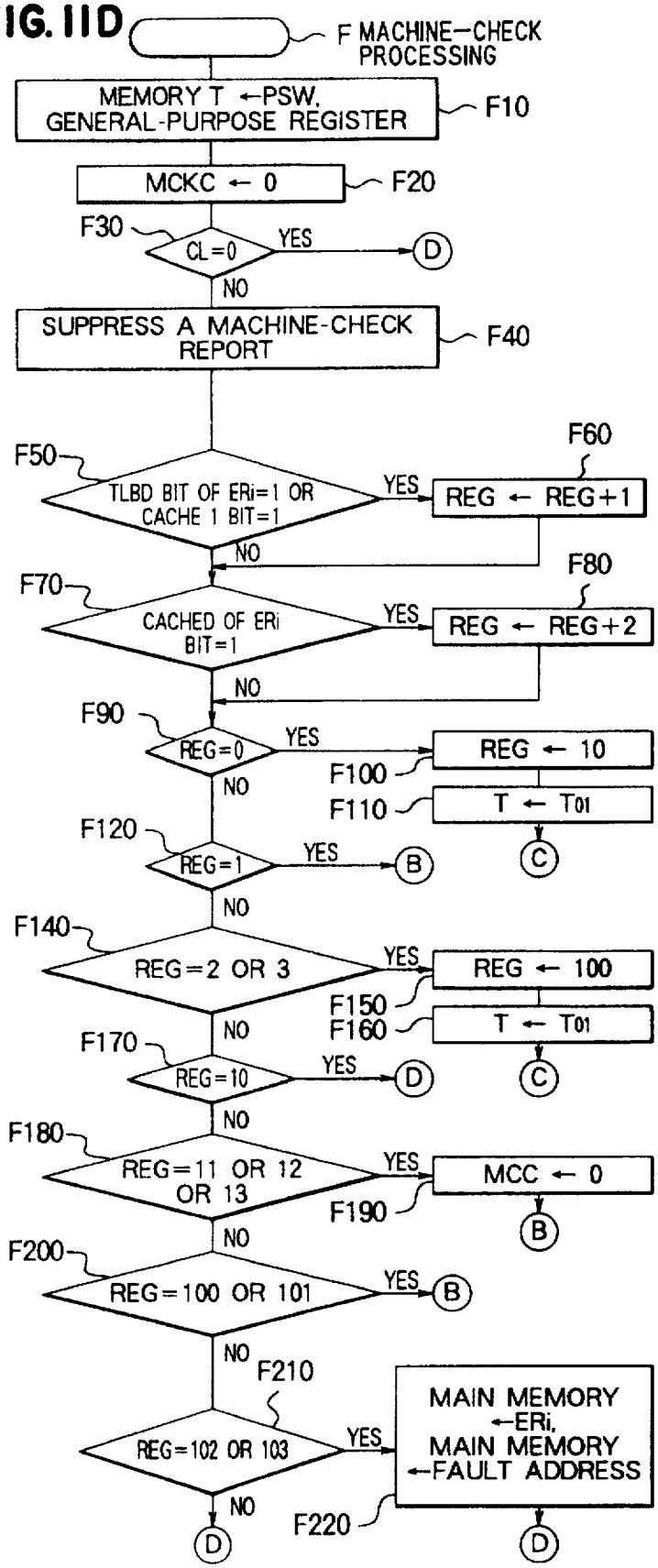

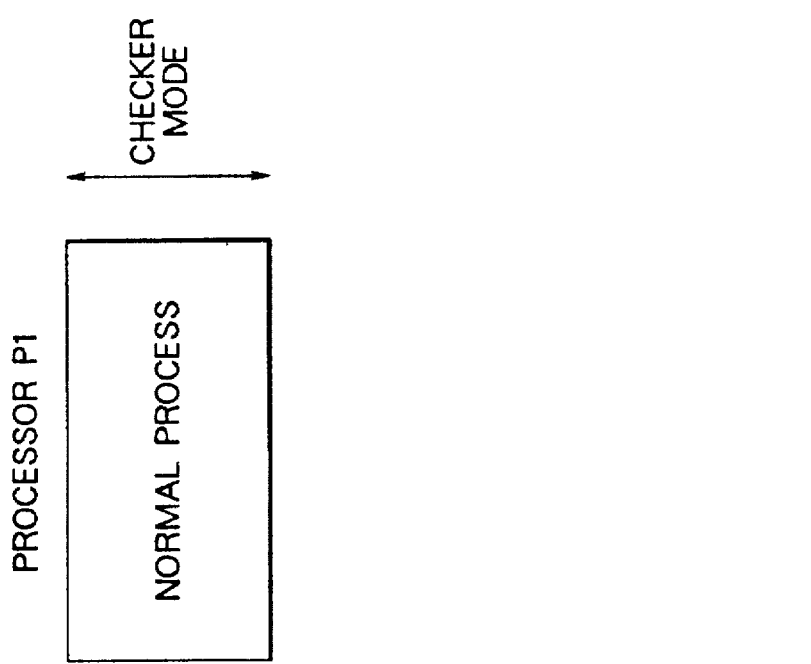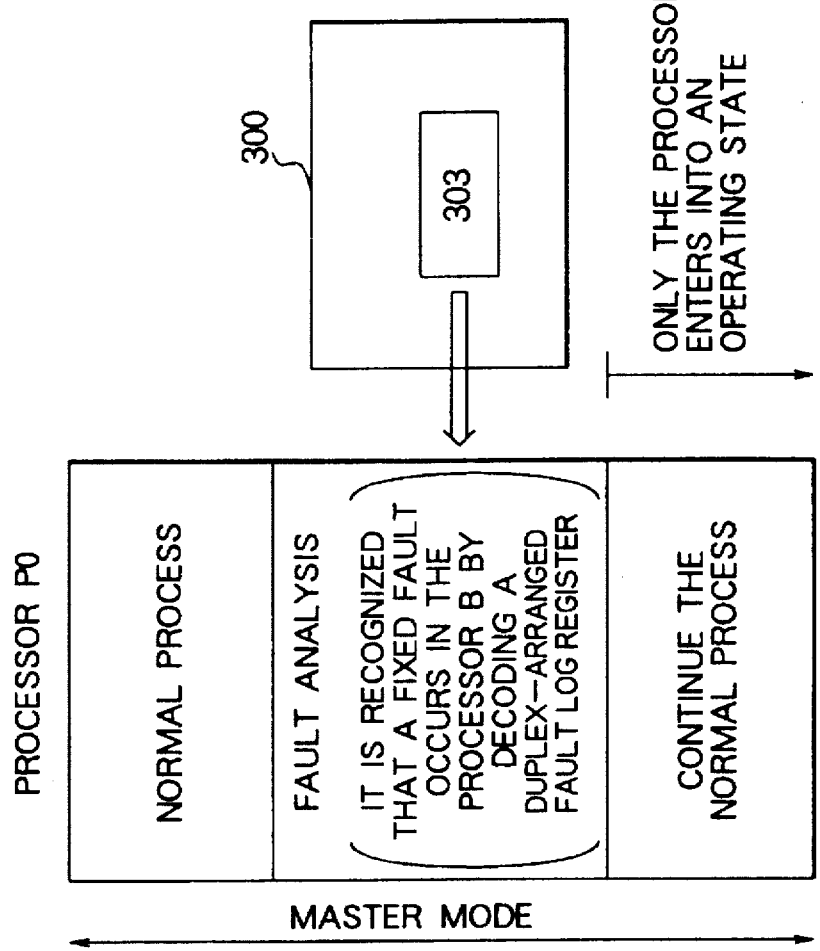

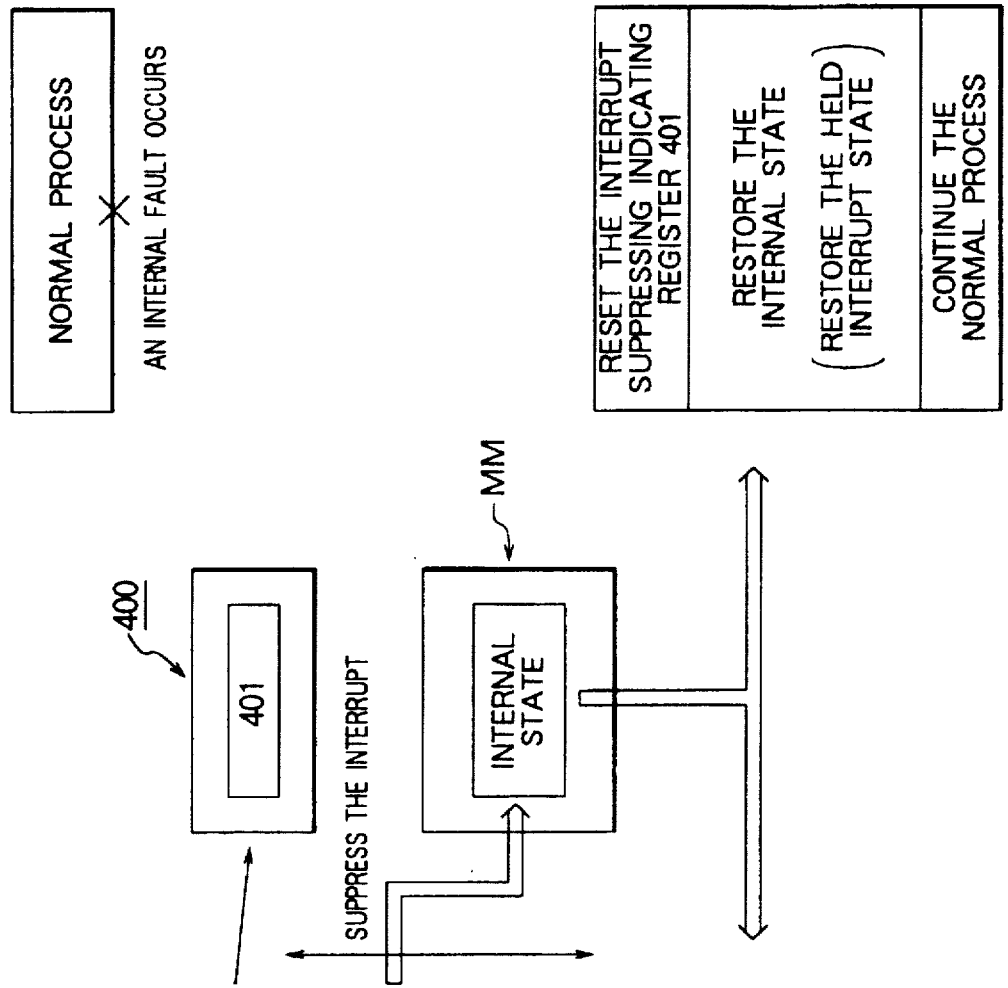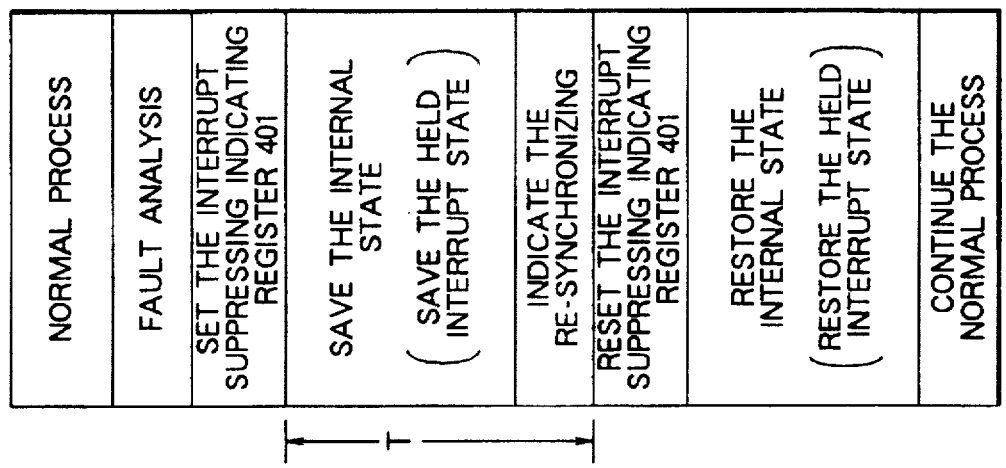

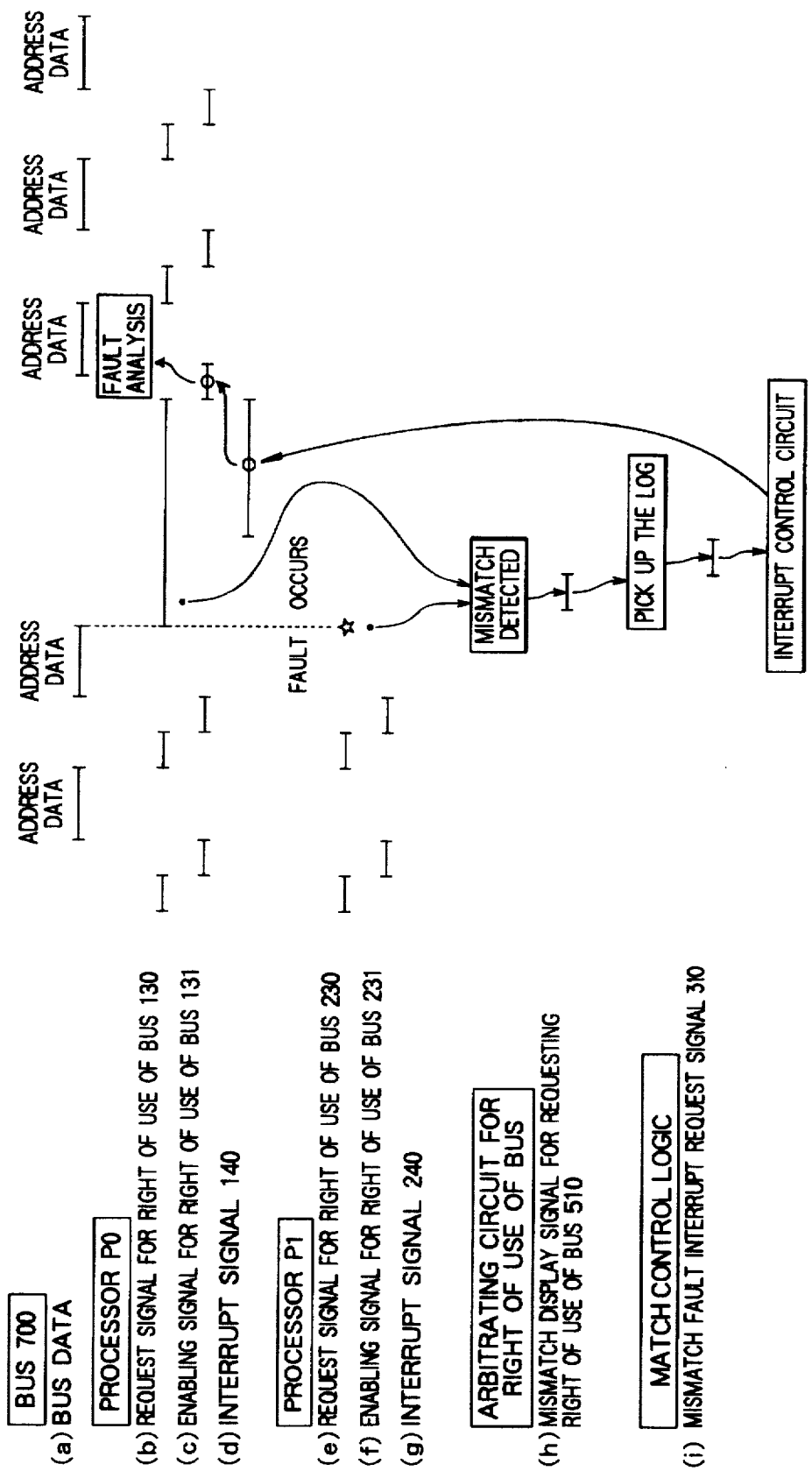

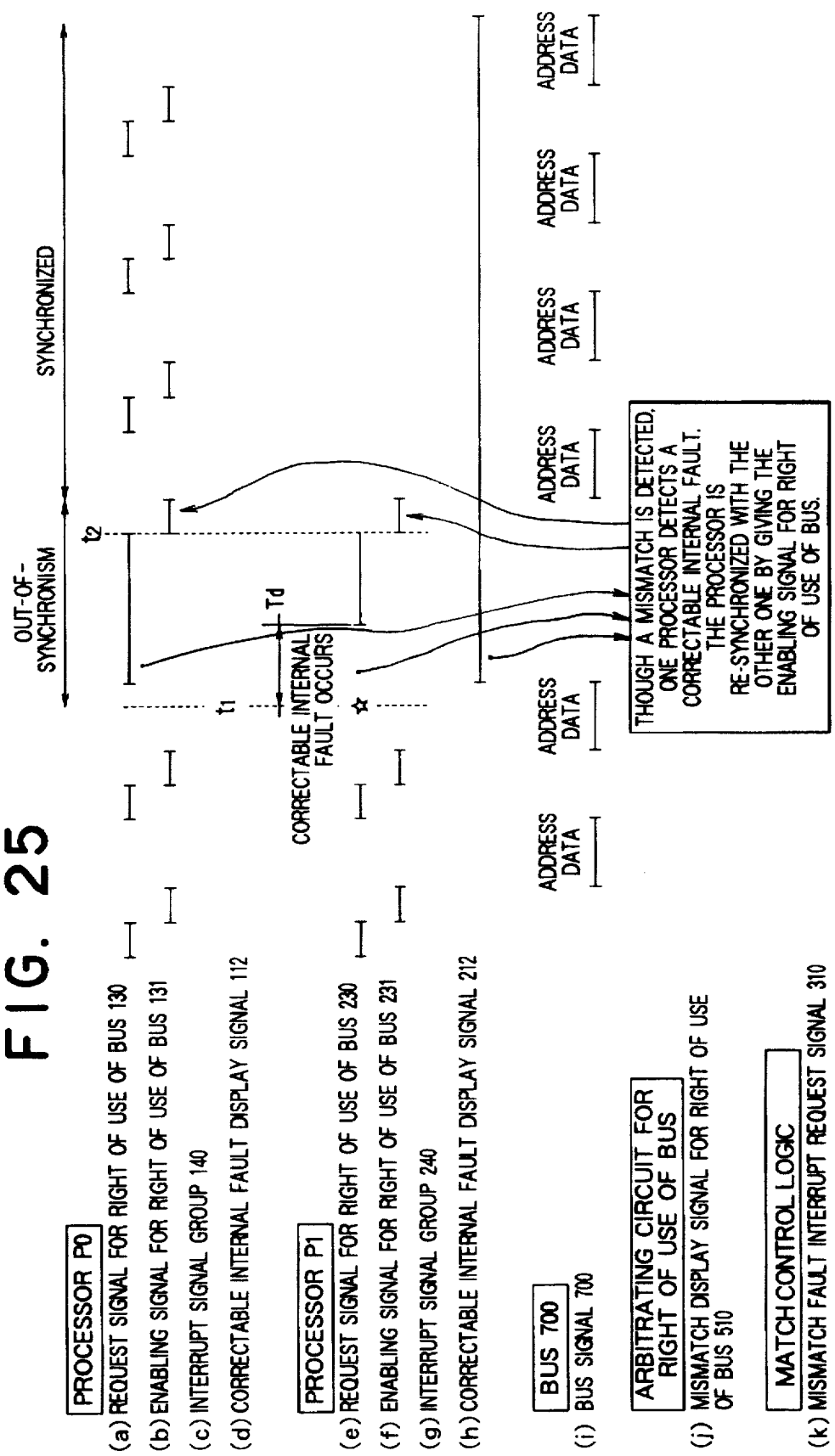

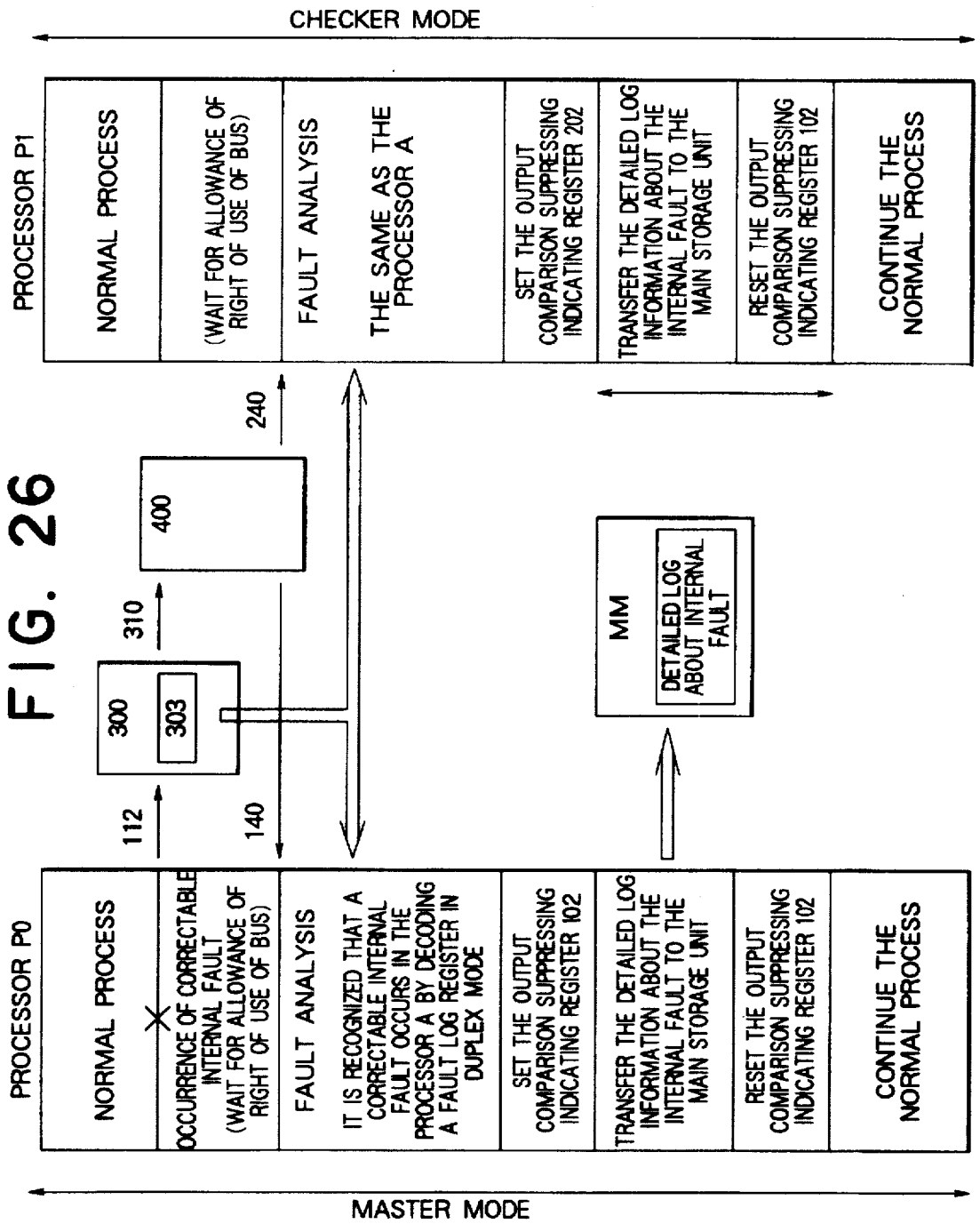

FIG. 27A

IF A CORRECTABLE INTERNAL FAULT OCCURS WHEN THE REGISTER FOR INDICATING PREVENTION OF ASYNCHRONISM IS NOT SET a. NO CORRECTABLE INTERNAL FAULT OCCURS

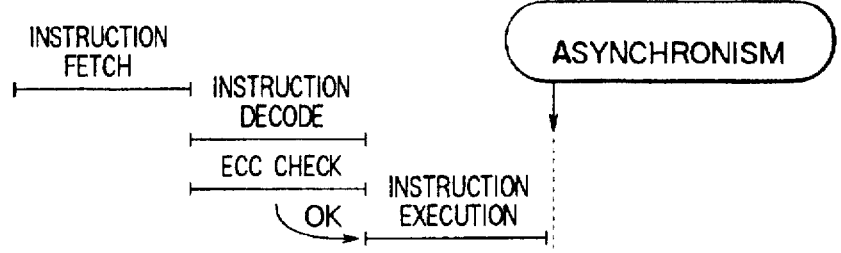

b. A CORRECTABLE INTERNAL FAULT OCCURS

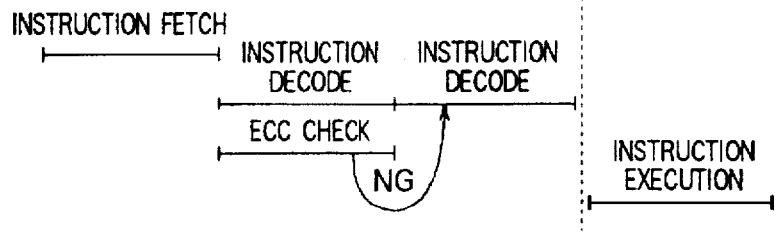

FIG. 27B

IF A CORRECTABLE INTERNAL FAULT OCCURS WHEN THE REGISTER FOR INDICATING PREVENTION OF ASYNCHRONISM IS SET a. NO CORRECTABLE INTERNAL FAULT OCCURS

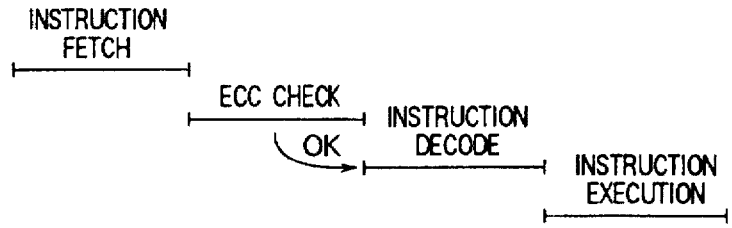

b. A CORRECTABLE INTERNAL FAULT OCCURS

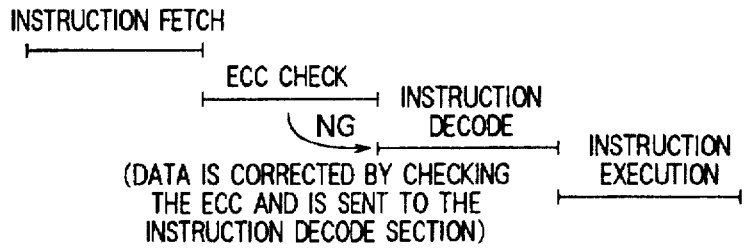

(DATA IS CORRECTED BY CHECKING THE ECC AND IS SENT TO THE INSTRUCTION DECODE SECTION)

FAULT RECOVERING SYSTEM PROVIDED IN HIGHLY RELIABLE COMPUTER SYSTEM HAVING DUPLICATED PROCESSORS

This application is a continuation of application Ser. No. 08/08/630,023, now abandoned, filed on Apr. 9, 1996, which is a continuation of 08/123,857, now abandoned, filed on Sep. 17, 1993.

BACKGROUND OF THE INVENTION

The present invention relates to a duplicated processor type reliable computer system which is arranged to have duplicated processors of a master processor and a checker processor. The system causes the master processor and the checker processor to perform the same operation and compares the output results of the processors with each other for the purpose of detecting any fault that might exist.

Such a duplicated processor type information processing system is intended to prevent an erroneous output from being sent out. If, therefore, any fault takes place on the master processor or the checker processor, the compared result indicates a mismatch.

According to recent trends, a processor is, in general, configured to have a RAM built inside of a chip or have a large capacity of RAM attached to the outside of the chip, and control of the RAM is performed directly without a bus. To cope with an intermittent fault (which may temporarily take place when a value inside of the memory is inverted into 0 or 1 from disturbances like alpha rays though no fixed fault is present in the hardware) occurring in a RAM, the processor serves to add a redundant bit to the data to be stored in the RAM so as to detect or correct the intermittent fault by using the redundant bit.

In a duplicated-processor arrangement, if an intermittent fault takes place in a RAM provided in the processor, the processor in which a fault occurs needs time for correcting the fault. The correcting time causes the fault-occurring processor to delay its output timing. This delay results in a mismatch between the outputs of the master and the checker processors.

If such a mismatch takes place, there has been proposed a technique of enabling the processor in which no fault occurs to operate alone or enabling a highly reliable operation of both of the processors to be continued. As an example, a technique disclosed in JP-A-247731 may be referred to. This technique is arranged to have a processor having a diagnosis program built therein and a diagnosis processor for controlling duplicated processor comparison. If a mismatch takes place in the duplicated-processor comparison, the diagnosis processor operates the processors to perform the diagnosis program. Based on the diagnosis result, the processor in which a fault occurs is specified. Then, it is determined if the other processor is operating alone or if both of the processors are initialized for continuing the operation of the processors in a duplicated-processor comparison mode (referred to as a duplex mode).

In the prior art, when the processors can operate in a duplex mode, both of the processors are reset. That is, the process is not considered to be started from the time when the fault occurred. It means that if a mismatch resulting from the intermittent fault is detected when a series of processes are proceeding, the process has to be retried from the beginning.

In other words, while the intermittent faults include serious faults, such as a fault in a data cache which is required to reset the system, the intermittent faults also include light faults, such as a fault in an address converting buffer or an instruction cache in which the main memory has the data copy. The above-mentioned technique, however, does not consider the latter case.

Further, the above-mentioned technique does not consider that a fault recovering process has to be selected for the corresponding intermittent fault. For example, a fault such as a 1-bit error of ECC can be corrected on the hardware immediately when the error is detected, while another fault such as a 2-bit error of ECC can be corrected only on the software.

On the other hand, in a system arranged such that a checker processor serves to compare the output results, the comparison is done when the checker processor outputs the processed result. Hence, when the master processor outputs data onto the bus, the checker processor may not check the data. This results in delaying the fault detection. To overcome this problem, the technique as disclosed in JP-A-3-217944 is arranged to add a control signal between the master processor and the checker processor so that the checker processor may check the output result on the bus enable timing of the master processor. The technique disclosed in JP-A-3-175538 is arranged to add a control signal for doing a comparison indication from the master processor in order to check the operational result inside of the processor.

These techniques, however, have a problem that the coupling relation between the processors is made complicated, because a special signal is added to speed up the fault detecting timing.

SUMMARY OF THE INVENTION

It is a first object of the present invention to provide a duplicated-processor type computer system which is capable of continuing the process at the stage immediately before occurrence of a fault by using the duplicated processors, if the fault is an internal fault resulting mainly from an intermittent fault and a mismatch between the processed results of both of the processors occurs.

It is a second object of the present invention to provide a duplicated processor type computer system which is capable of rapidly continuing the process in a duplex mode if there occurs a fault such as a 1-bit error of ECC which may be corrected on the hardware.

It is a third object of the present invention to provide a double processor type computer system which is capable of allowing one processor to solely continue the process if a fixed fault occurs in the other processor.

It is a fourth object of the present invention to provide a duplicated-processor type computer system which is capable of easily determining if the mismatch detecting function result is proper.

In carrying out the first object, a highly reliable computer system which can continue a process in a duplex mode if an internal fault occurs in a processor includes a main memory, a first and a second processor, comparing means for comparing the outputs of the first and the second processors and detecting a mismatch between the outputs of the processors, and means for synchronizing the first with the second processors on a clock and re-operating the first and the second processors. One of the processors operates to write an internal state of the processor in the main memory and save it if a mismatch between the outputs of the comparing means is detected. Further means determine a factor of the fault and recognize the fault occurring in the processor based on the determined result. If it is determined that the duplicated processors can continue the process in a duplex mode, further means give a synchronous indication to the reoperating means, initialize the processors in response to a re-operating indication output when the re-operating means receives the synchronous indication, read the internal information saved in the main memory, and initiate continuation of the process.

With the above-mentioned arrangement, if an internal fault occurs in any one of the two processors operating in synchronism with each other and a mismatch fault occurs, the process is allowed to be continued from the time when the mismatch fault occurs, by using the duplex arrangement based on the internal information of the processor with no fault. If the computer system provides a RAM in which an intermittent fault is likely to occur, then, the computer system operates to reduce the event corresponding to a system fault and rapidly recover the process in which the fault occurs.

In carrying out the second object, a highly reliable computer system which is capable of continuing the process in a duplex mode when an internal fault takes place in the processors includes a main memory, a first and a second processor for outputting fault information when a fault occurs, a data bus connecting between the main memory and the first and the second processors, comparing means for comparing the outputs of the first and the second processors with each other and detecting a mismatch between the outputs, match control logic having means for controlling the operating mode of each of the processors and re-operating the first and second processors, and an arbitrating circuit for arbitrating a right of use of a bus for each processor. One of the processors serves to output a signal indicating a recoverable internal fault occurring to the arbitrating circuit for a right of use of the bus if the detected internal fault is an internal fault to be recovered on the hardware. The arbitrating circuit for a right of use of a bus serves to suppress outputting of an enabling signal for a right of use until the request signals for use of a bus from the first and the second processors reach it in response to the indicating signal and to output the enabling signal for use of a bus to the first and the second processors after the request signals for use of a bus from both of the processors reach it.

With the above-mentioned arrangement, if there occurs an internal fault which can be recovered on the hardware, it is possible to suppress occurrence of fault which has been conventionally considered as a mismatch fault because the processors are out of synchronism if the substantially same process is carried out.

In carrying out the third object, a highly reliable computer system provides a main memory, a first and a second processor for outputting fault information when a fault occurs, a data bus connecting the main memory and the first and second processors, comparing means for comparing the outputs of the first and second processors with each other and detecting a mismatch between the outputs, and match control logic for specifying the processor in which a fault occurs, based on the fault information and controlling the operating mode of each of the processors. The match control logic serves to identify the fault processor in which a fault occurs, based on the fault information received from the processor when a fixed fault occurs and the detected mismatch between the outputs of the processors, switching the mode of the other processor into a master mode. The processor now switched into the master mode serves to determine the factor of the fault and continue the process by itself without outputting a synchronous indication to the re-operating means if the fault is determined as a fixed fault of the other processor.

In carrying out the fourth object, means are provided for indicating insertion of a specific instruction train to either one of the two processors so that the specific instruction train may cause the internal fault to occur and the mismatch between the outputs to forcibly occur.

By causing the mismatch state between the outputs of the processors to forcibly occur, it is possible to easily determine if the mismatch detecting function is valid.

BRIEF DESCRIPTION OF THE DRAWINGS

FIGS. 11 (A–D) is a flowchart showing a machine checking program according to the second embodiment of the present invention;

FIGS. 19 (A–B) are flowcharts showing the process for operating only the processor in the master mode in the arrangement shown in FIG. 18;

FIGS. 21 (A-B) are flowcharts showing a re-initializing process to be executed in the processor provided in means for holding an interrupt;

FIG. 24 is a flowchart showing a process executed for rapidly detecting a fault by means of a mismatch of a request signal for use of a bus;

FIG. 25 is a flowchart showing a process executed for outputting the enabling signals for use of a bus in a synchronous manner for re-synchronizing the processors in the arrangement shown in FIG. 23;

FIG. 26 is a flowchart showing a process executed for temporarily stopping a function of detecting a mismatch fault and re-synchronizing the processors;

FIG. 27A and 27B are flowcharts showing processes executed for preventing asynchronism by keeping the same processing cycles between occurrences of a correctable internal fault;

DESCRIPTION OF THE PREFERRED EMBODIMENT

Hereafter, the description will be directed to the first through fifteenth embodiments of the present invention. The first and the second embodiments are concerned with an operation for processing a fault one (P0) of the two processors is fixed as a master processor. The third embodiment et seq. are concerned with an operation for processing a fault by switching between the master mode and the checker mode, depending on the factors of the fault.

At first, the first embodiment of the present invention will be discussed in detail in reference to the drawings.

Figure 1:
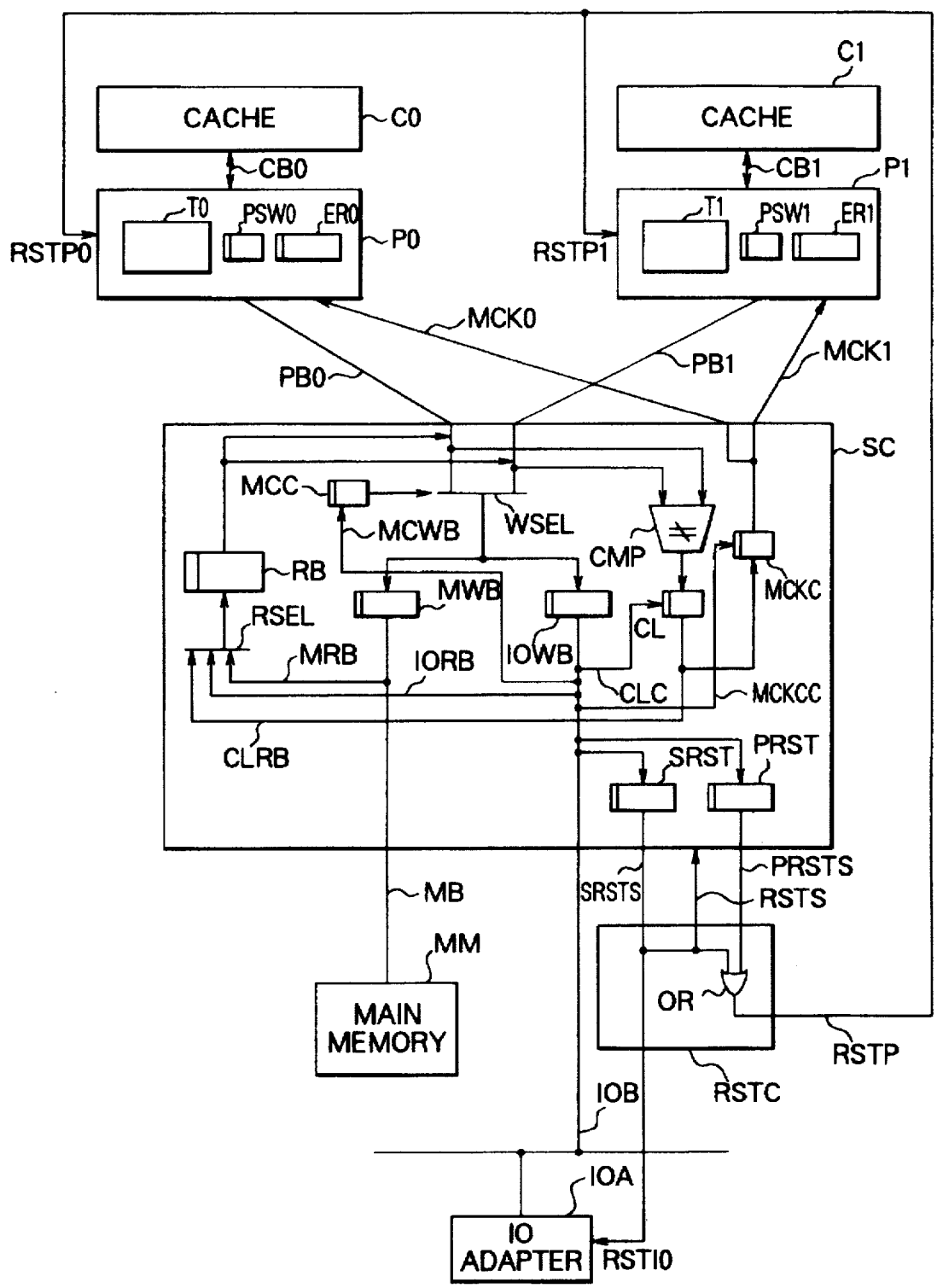
FIG. 1 is a block diagram showing an overall arrangement of hardware according to a first embodiment of the present invention.

FIG. 1 shows an arrangement of the device according to the first embodiment. At first, the overall arrangement and then the operation will be described.

In FIG. 1, C0 and C1 are cache memories. P0 and P1 are processors. CB0 is a cache bus connecting between C0 and P0. CB1 is a cache bus connecting between C1 and P1. T0 and T1 are TLBs for the processors P0 and P1. Each TLB is composed of a pair of logical address and a physical address. In this embodiment, the TLB is held inside of the processor. Alternatively, it may be located outside of the processor. ER0 and ER1 are fault registers for indicating a fault factor of the cache or TLB. PSW0 and PSW1 are processor status registers (specifically, program counter) for storing values indicating the state of the processors. SC is a system control LSI. MM is a main memory. IOA is an input/output (IO) adapter. RSTC is a reset control LSI. PB0 is a processor bus connected between the processors P0 and SC. PB1 is a processor bus connecting the processors P1 and SC. The processor can transfer data to and from the system control LSI through this processor bus. In the system control LSI (SC), MCKC is a machine-check reporting circuit. MCK0 is a machine-check signal line connected between the machine-check reporting circuit MCKC inside of the SC and the processor P1. WSEL is a selector circuit for selecting any one of the processor buses PB0 and PB1. MCC is a processor selecting register for indicating the selection. The master checker control circuit is composed of the WSEL and the MCC. CMP is a comparator circuit for comparing data from PB0 with data from the PB1 for detecting a mismatch between them. CL is a check latch to be set when the mismatch is detected. MWB is a memory write buffer for holding data to be written to the main memory MM and is composed of a memory address and memory-written data. IOWB is an IO write buffer for holding data to be written to the IO adapter and is composed of an IO address and IO write data. MB is a memory bus connecting the system control LSI (SC,) and the main memory MM. ISO is an IO bus connecting the SC and the IO adapter IOA. RESEL is a selector circuit for selecting any one of data read from the main memory, data read from the IO adapter and data read from the check latch and saving the selected data to the read data buffer RB. The data read from the main memory MM is sent to the selector RSEL through the memory read bus MRB. The data read from the IO adapter IOA is sent to the selector RSEL through the IO read bus IORB. The data read from the check latch CL is sent to the selector RSEL through the check latch read bus CLRB. The read data buffer RB is connected to both of the processor buses PB0 and PB1. The read data can be transferred to the processors P0 and P1. That is, as the write data, one of the data from the processors P0 and P1 is selected, while the read data is transferred to both of the processors P0 and P1.

A signal line CLC connecting the IO write buffer IOWB and the check latch CL is a control signal line for resetting the check latch CL. Likewise, a signal line MCKCC connecting the IO write buffer IOWB and the machine-check reporting circuit MCKC is a control signal line for resetting the machine-check reporting circuit MCKC. That is, the check latch CL and the machine-check reporting circuit MCKC are mapped onto the IO space and are cleared by writing a proper value onto the IO address. The processor selecting register MCC is connected to the IO write buffer IOWB through the data line MCWB. By writing data "0" to the MCC register, the processor P0 is selected, while by writing data "1" to the MCC register, the processor P1 is selected. By this operation, either one of the master processor and the checker processor may be freely selected.

On the other hand, PRST is a processor reset register which is connected to the reset control LSI (RSTC) through the signal line PRSTS. SRST is a system reset register which is connected to the reset control LSI (RSTC) through the signal line SRSTS. These two reset registers are mapped to the IO space. By writing data to their IO addresses, the data may be written to the processor reset register PRST and the system reset register SRST through the IO write buffer IOWB. When reset indicating data is written to the processor reset register PRST, a reset signal is applied to a reset input terminal RSTP0 of the processor P0 and a reset input terminal RSTP1 of the processor P1 through an OR circuit OR inside of the reset control LSI (RSTC) and a processor reset signal line RSTP. As a result, the processor state (a fault register, a general-purpose register, a program counter, etc.) is saved in the main memory so that the processor initializing program may be forcibly started. When the reset indicating data is written to the system reset register SRST, a reset signal is applied to the reset input terminal RSTP0 of the processor P0 and the reset input terminal RST1 of the processor P1 through the reset control LSI (RSTC). The reset indicating data is applied onto the reset input terminal RSTS of the system control LSI (SC) and the reset input terminal RSTIO of the IO adapter. When the overall system is reset, as stated above, the processor initializing program is started.

Figure 2:
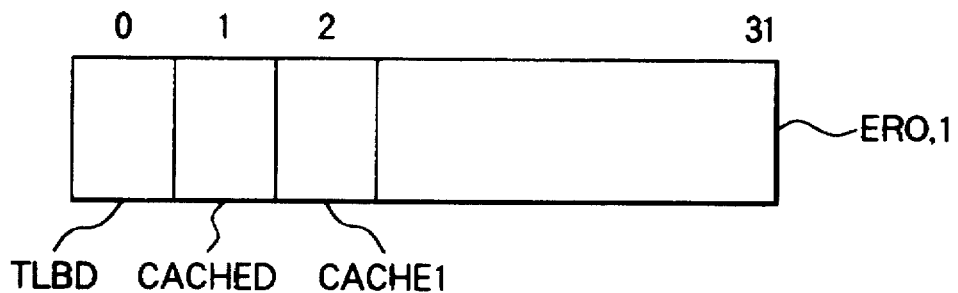
FIG. 2 is a diagram showing a fault register built in the processor shown in FIG. 1.

FIG. 2 is a diagram showing the arrangements of the fault registers ER0 and ER1.

A bit 0 is a TLBD bit indicating when a TLB fault occurs. A bit 1 is a CACHED bit for indicating when a data cache fault occurs. A bit 2 is a CACHEI bit for indicating when an instruction cache fault occurs. When the processor accesses the TLB and the cache, these bits are set by the processor itself when any fault is detected.

Figure 13:
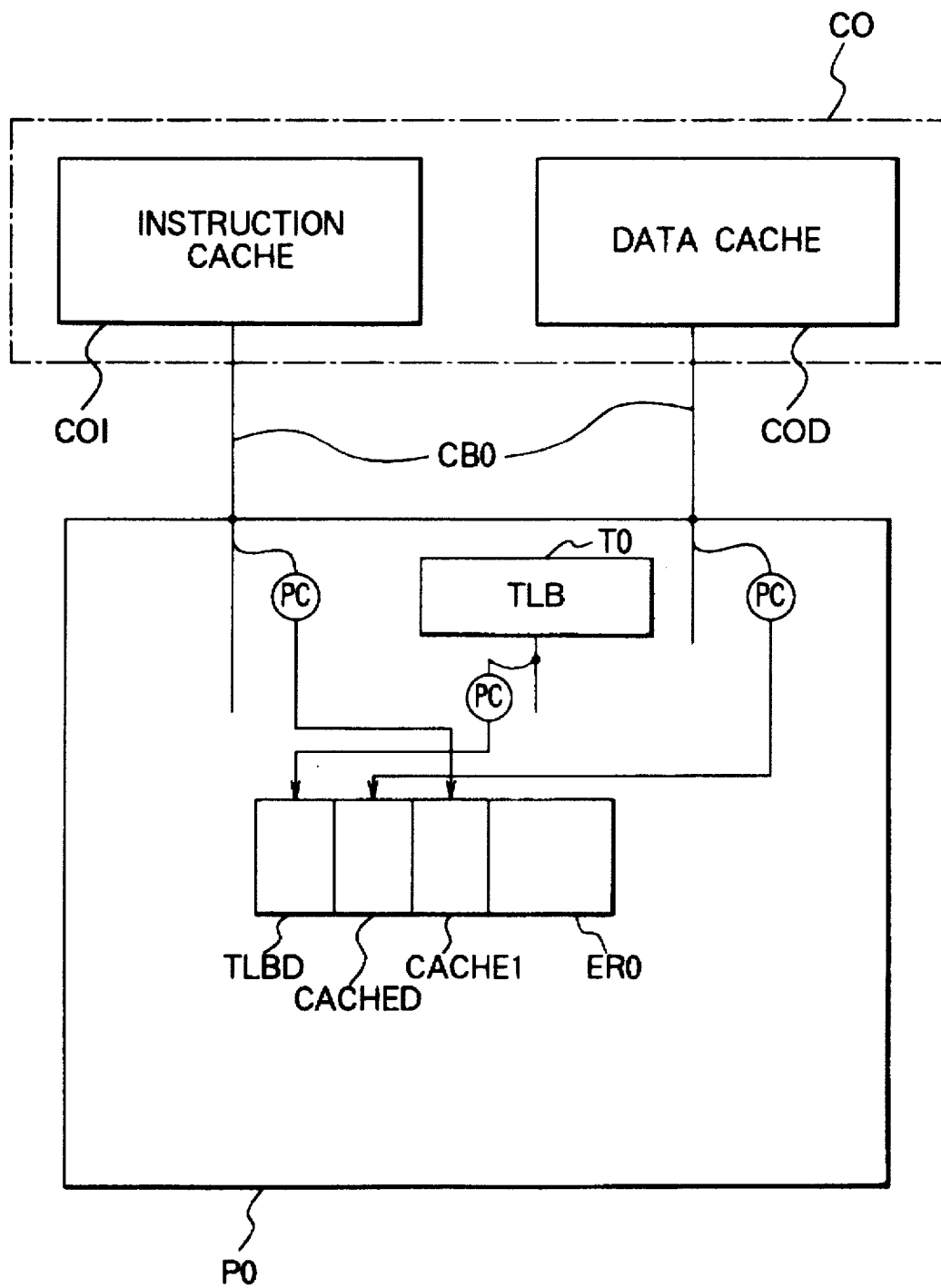
FIG. 13 is a block diagram showing a circuit for detecting a fault factor inside of a processor.

FIG. 13 shows a circuit for detecting a fault occurring in the TLB or cache inside of the processor P0. In FIG. 13, C0 is a cache. C0I is an instruction cache. C0D is a data cache. CB0 is a cache bus. PC inside of the processor P0 is a parity check circuit. T0 is a TLB. The parity check is an even parity check circuit. That is, the circuit operates to add all of the bits of the read data and determine that no fault occurs if the added result is "0" or any fault occurs if the added result is "1". Each PC circuit can determine if a fault occurs inside of the processor in the ER0, because the PC circuit sets the output to each bit of the fault register ER0.

In general, many faults may occur in the processor such as a processor-bus fault and an erroneous operation fault. The fault in the TLB or the cache may occur most frequently. Hence, the fault in the TLB or the cache is quite important.

Generally, the faults may be grouped as follows: some (correctable internal faults) are detected inside of a processor as a 1-bit error of ECC as in the TLB and are corrected by the hardware itself; some (uncorrectable internal faults) are detected inside of a processor as a parity error or a 2-bit error of ECC as in the cache or the TLB but are not corrected by the hardware; and the others (fixed faults) are basically determined by diagnosis in an initializing routine a disconnection of a signal line in the processor, a 0-fixed fault, a 1-fixed fault, or a parity error in a register except the RAM, such as the cache or the TLB but cannot be recovered.

The present embodiment is intended to a correctable internal fault and uncorrectable internal fault. This embodiment operates to determine if the fault in an address converting buffer is light or not serious (in which case the copy of data is held in the main memory) or serious (in which case no copy of data is held in the main memory and data is erased from the system).

Next, the description will be directed to the operation to be done when a fault occurs, referring to FIGS. 3 to 6.

To simplify the explanation, it is assumed that the processor P0 is a master processor and the processor P1 is a checker processor. This assumption is not essential to the present invention.

When a mismatch occurs between the outputs PB0 and PB1 of the processors P0 and P1, the comparator circuit CMP operates to detect a mismatch so that the check latch CL may be set to "1". Further, the machinecheck reporting circuit MCKC may be set to "1". Therefore, a machine-check signal is applied to the processors P0 and P1 connected through the machine-check signal lines MCK0 and MCK1, respectively.

Figure 3:
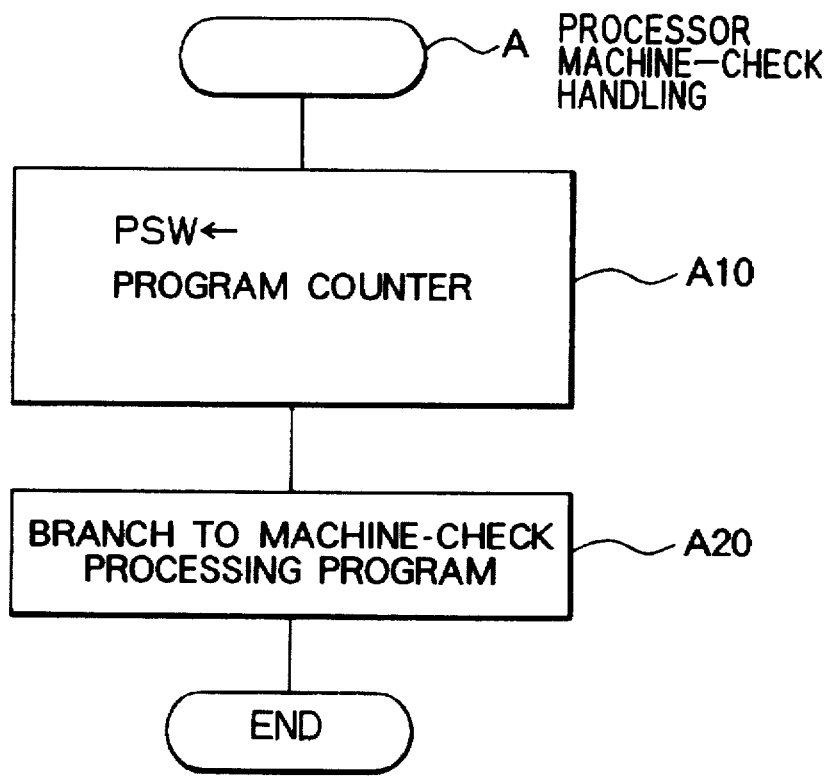
FIG. 3 is a flowchart showing a process to be started for the first time by the processor when a machine check signal is input to the processor.
Figure 9:
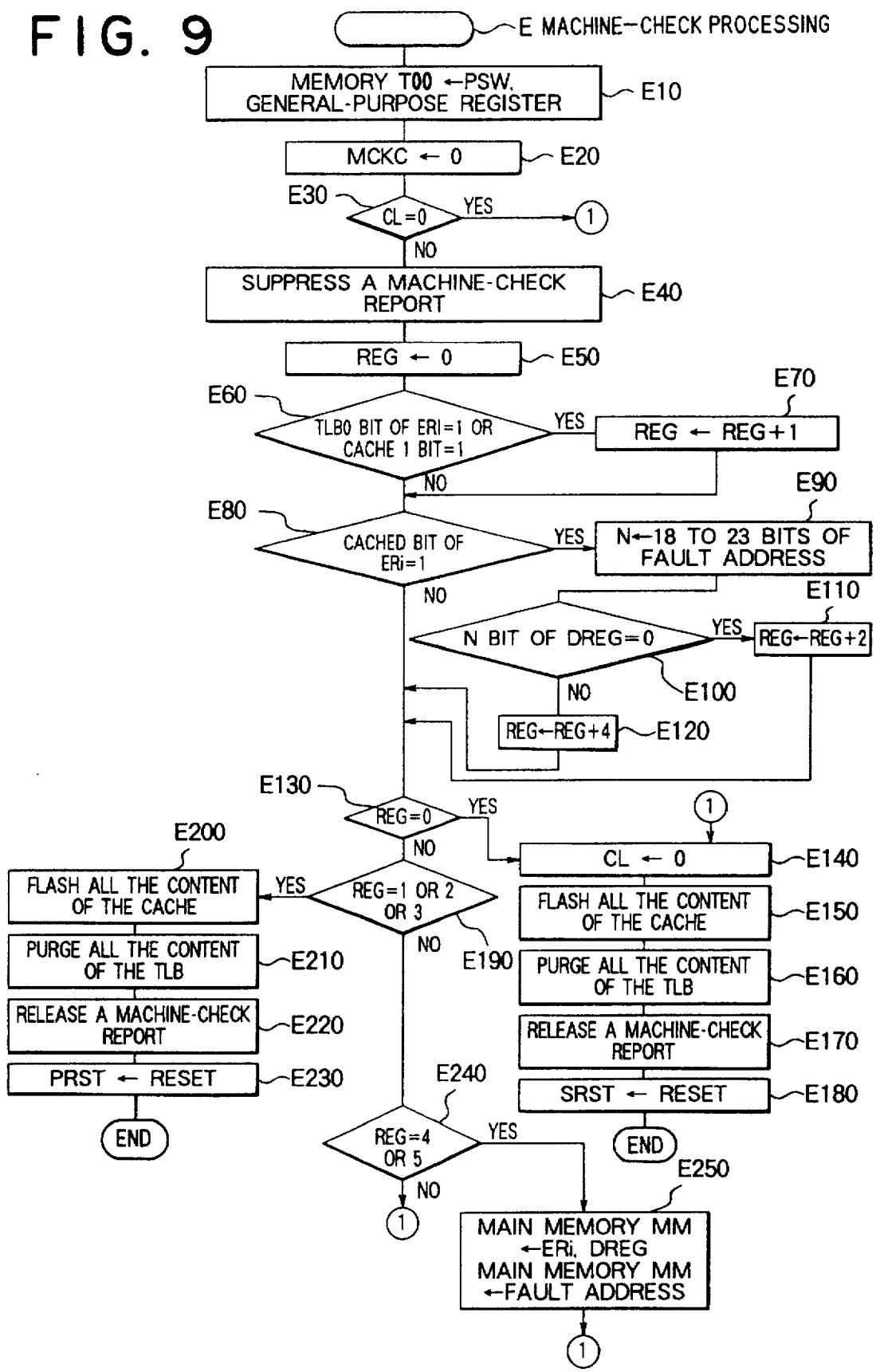
FIG. 9 is a flowchart showing another machine checking program according to the first embodiment of the present invention.

FIG. 3 shows a process to be executed initially when a machine check is reported to the processors P0 and P1. The process is automatically executed by a processor itself. That is, a fault recovering program is stored in a memory (not shown) inside of the processor P0 and is started in response to a machine-check mismatch report. A10 denotes a process in which the state of the processor at this point is saved to the processor state register PSW. The actually saved data is a program counter of the master processor P0. A20 denotes a process branched into a machine-check processing program. The branch address is preset in the main memory. As a result, the processor P0 and P1 can be executed by the machine-check processing program as shown in FIGS. 4, 9 and 11.

Figure 4:
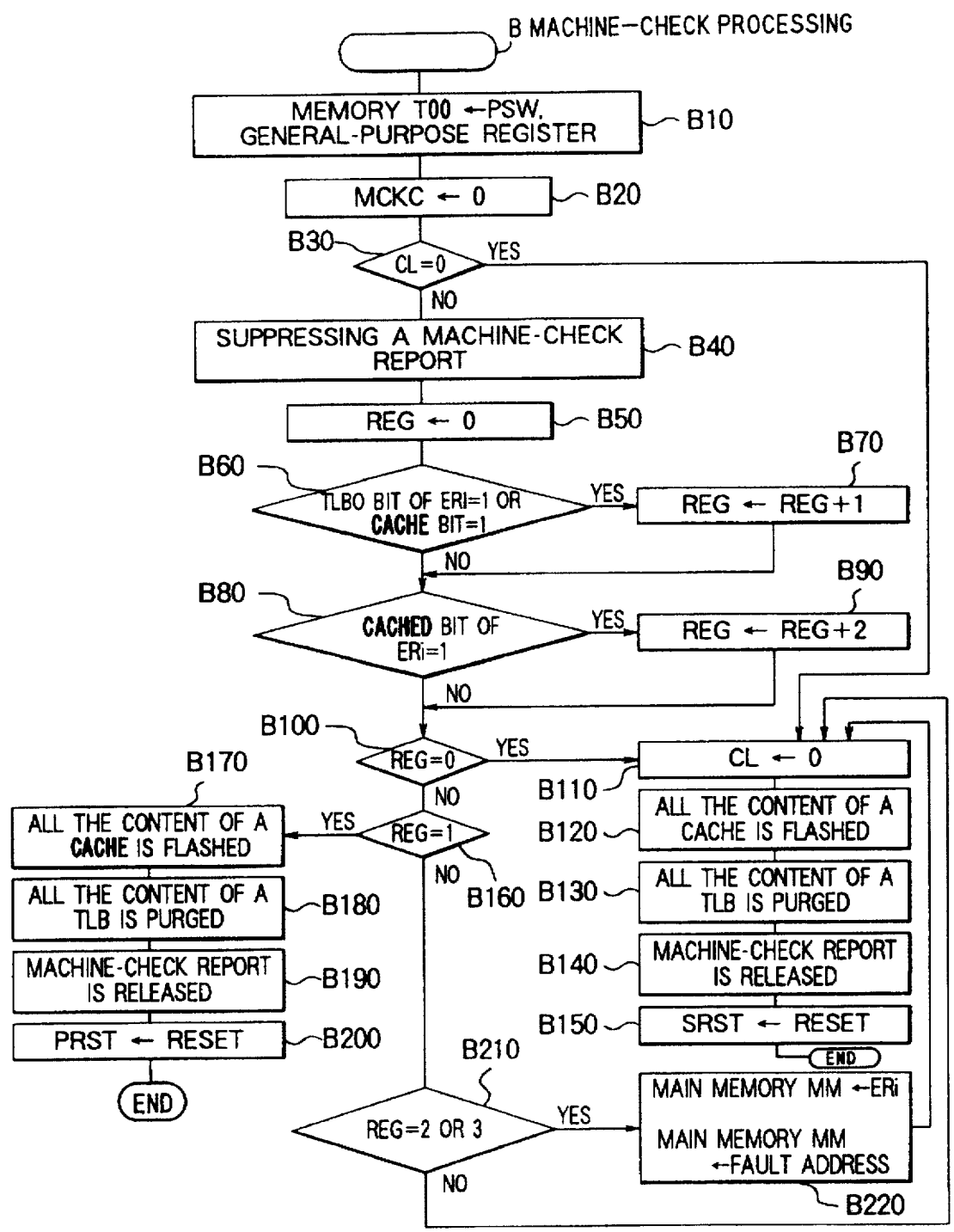
FIG. 4 is a flowchart showing a machine checking program according to the first embodiment of the present invention.

FIG. 4 shows a processing flow of the machinecheck processing program. The present processing flow is assumed if the processor P0 is fixed as a master processor. FIG. 9 shows a processing flow of the machine-check processing program using a cache state register in order to determine a fault level of the data cache in more detail. FIG. 11 shows a processing flow of a machinecheck processing program for switching the master processor P0 into P1 according to the fault level without having to fix the processor P0 as a master processor. In this processing program, the master processor as well as the checker processor may operate. Later, each machine-check processing program will be described in detail.

FIG. 4 shows a machine-check processing program on the assumption that the processor P0 is fixed as a master processor. In this machine-check processing program, in B30, it is checked if the bit of the check latch CL is "0" or "1". This is because the hardware fault may occur in the machine-check reporting circuit MCKC itself so that the machine-check signal may be erroneously output though the outputs of the processors P0 and P1 are matched to each other. B10 denotes a process for saving the state of the processor (a value of the PSW, the inside state of the general purpose register) to the main memory address T00. This becomes necessary when the process is continued. B20 denotes a process for setting the machine-check reporting signals MCK0 and MCK1 to "0" when the processors receive the machine-check report. That is, by writing a value of "0" to the machine-check reporting circuit MCKC, the corresponding address and data are stored in the IO write data buffer IOWB shown in FIG. 1. Then, the machine-check reporting circuit MCKC is reset through the signal line MCKCC. As a result, the signal levels of the machinecheck signal lines MCK0 and MCK1 are set to "0". In actuality, the data written to the MCKC is output data from the master processor P0. B30 denotes a process for determining if the CL bit is "0" for confirming that the machine-check processing program is started because of the mismatch between the outputs of the two processors. If CL is "1", it indicates that the data mismatch fault has occurred. If the data mismatch fault occurs, the machine-check report suppressing process as shown in B40 is executed. This is a process for holding the state of the check latch CL and constantly resetting the machinecheck reporting circuit MCKC. This process can be executed through the CLC signal and the MCKCC signal shown in FIG. 1. If the master processor has a different fault factor from the checker processor, a mismatch occurs between the output data of the processors, so that the machine check is forcibly reported when the machinecheck processing program is being executed. The resetting process is required to be suppressed until the processing of the program is terminated. B50 denotes a process for writing a value of "0" to a readable/writable register REG inside of the system control LSI. This is used for determining the fault factor in the subsequent processes. B60 denotes a process for determining when the TLBD bit or the CACHEI bit of the fault factor register ERi (i=0 or 1) inside of the processor is "1". If yes, this fault is light enough to permit the process to continue.

In B70, a value of "1" is added to the REG for indicating that the fault is light. B80 is a process for determining whether or not the CACHED bit is "1". When the bit is "1", the fault is serious. In B90, a value of "2" is added to the REG for indicating that the fault is light. From the above-mentioned processes, based on the value of the REG, the fault level is determined so that the process may determine if it should continue or be interrupted.

B100 denotes a process for determining whether or not the REG holds a value of "0". If it holds "0", it means that no fault is detected in at least the master processor. If any fault occurs in the checker processor, the machine-check reporting factor becomes obvious. Hence, the master processor can continue the process. However, the present machine-check processing program provides no means for obtaining a fault status of a checker processor. Hence, no fault may be frequently detected in the fault factor register of the checker processor. In this case, the machine-check report indicating no cause is given. The cause is thus determined as a non-detected erroneous operating fault or the like. When the REG holds a value of "0", the processes from B110 to B150 are executed for preventing the error data from being written, thereby resetting the system. B110 is a process for clearing the check latch CL. B120 is a process for flashing all the content of the cache of the processor. The term "flash" means a process for rewriting the content of the cache to the main memory and then nullifying the cache. B130 is a process for purging the content of the TLB. The term "TLB purge" means a process for nullifying the TLB. B140 denotes a process for releasing a machine-check report. This is a process for releasing a check latch CL out of the holding state and releasing the reset state of the machine-check reporting circuit MCKC. This process can be executed through the CLC signal and the MCKCC signal shown in FIG. 1. B150 denotes a process for writing a reset command RESET to the system reset register SRST. As a result, the system resetting program is started through the processor resetting program shown in FIG. 5.

Next, B160 is a process for determining whether or not the REG holds a value of "1". When a value of "1" is held therein, the fault is determined to be light. The processes from B170 to B200 are executed. In the B170, all of the contents of the cache is flashed. In B180, all of the contents of the TLs is purged. In B190, the machine-check report is released. That is, if the occurring fault is so light that the data copy can stay in the main memory, the contents of the cache and the TLB in the master processor and the checker processor are set to the same state and then the reset command RESET may be written to the processor reset register PRST in B200. As a result, the processor resetting program shown in FIG. 5 can be executed.

B210 is a process for determining whether or not the REG holds a value of "2" or "3". If yes, it means that a cache fault is detected in the master processor. That is, the fault is serious. This is because the latest data staying only in the cache may be broken. In B220, after saving the content of the fault factor register and the fault address of the master processor to the main memory, the processes from B110 to B150 are executed (resetting the system). When a serious fault occurs, the content of the fault factor register and the fault address are saved into the main memory, the system is reset. For recovery, the fault analysis can be executed.

This is the end of the detailed description of the machine-check processing program.

Figure 5:
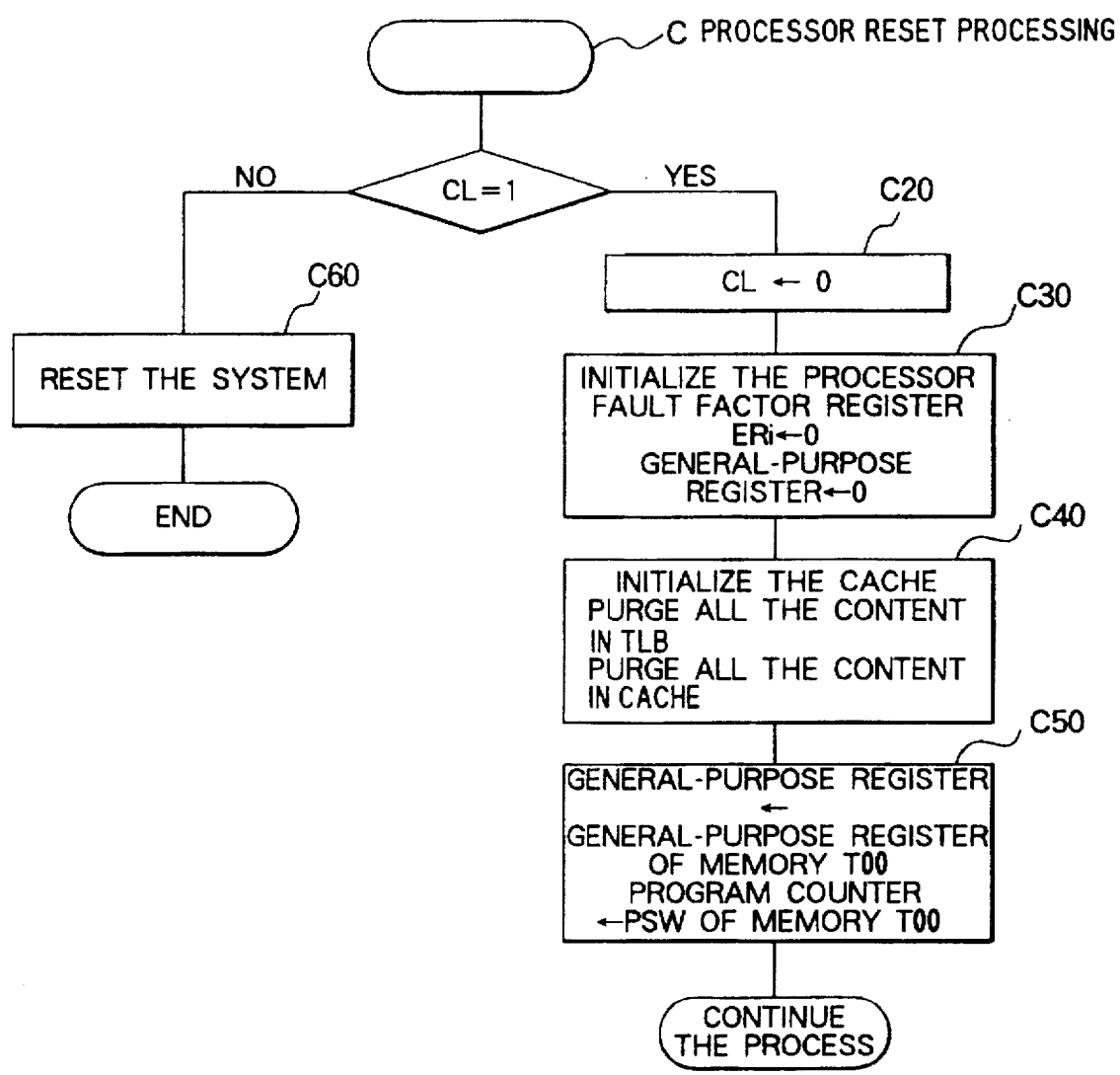
FIG. 5 is a flowchart showing a program indicating a processor resetting process.

Then, the description will be oriented to the processor resetting program shown in FIG. 5.

C10 is a process for determining whether or not the check latch CL holds a value of "1".

When a value of "1" is held therein, as is obvious from the machine-checking program shown in FIG. 4, the processor resetting makes it possible to continue the process. The processes from C20 to C50 are executed. On the other hand, when a value of "0" is held therein, it indicates a serious fault, which is required to interrupt the process. Hence, in C60, the system is reset (see FIG. 6). Next, in C20, the check latch CL is cleared. In C30, the processor is initialized. In C40, the cache and the TLB are nullified for completely initializing the processors P0 and P1. This initialization can be implemented by clearing the processor and its cache and TLB with the processor itself. Next, in C50, the state of the processor is read from the memory address T00 and then is set to the general-purpose register and the program counter so as to return to the state at the time when the fault occurred. At this state, the process is continued.

As stated above, with means for resetting the processor, the processors P0 and P1 are allowed to be initialized, thereby making it possible to continue the process.

Figure 6:
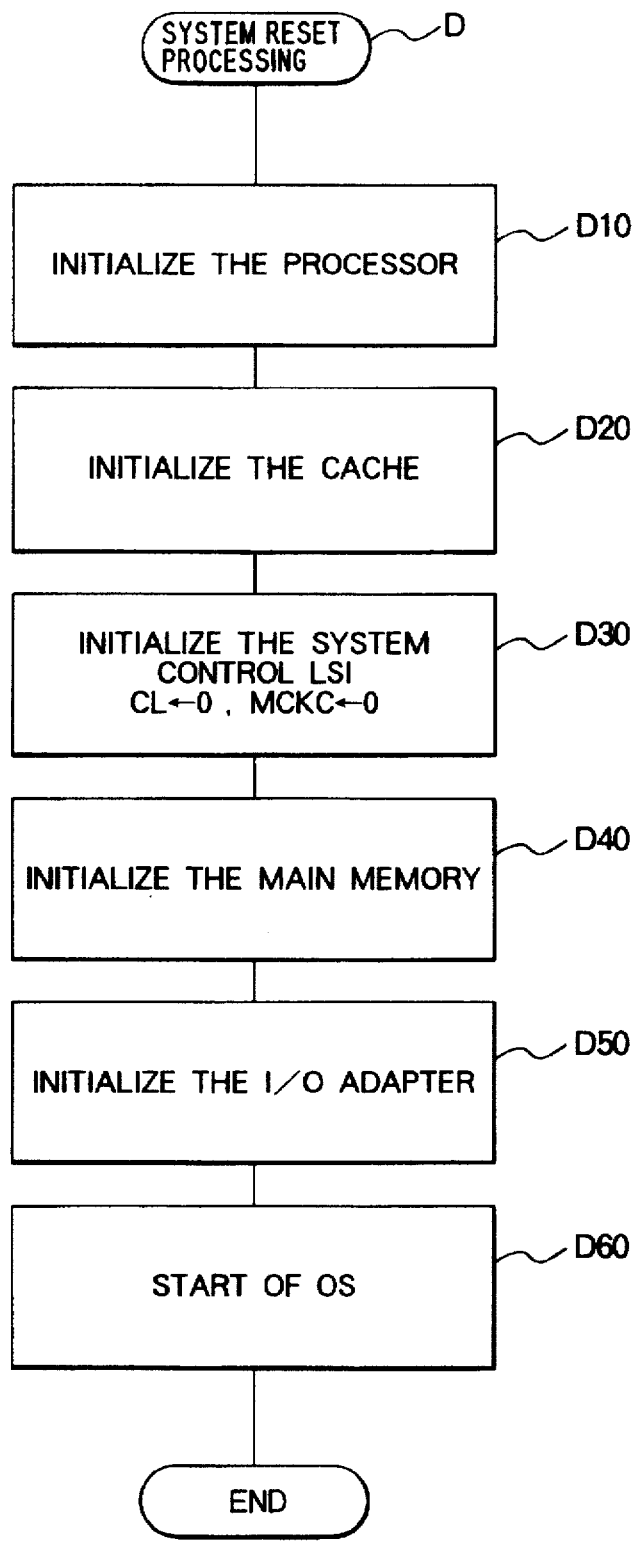
FIG. 6 is a flowchart showing a program indicating a system resetting process.

FIG. 6 is a flowchart showing a system resetting program.

D10 is a process for initializing a processor. D20 is a process for initializing a cache. D30 is a process for initializing the system control LSI. D40 is a process for initializing the main memory. In D50, the IO adapter is initialized, when initialization of the hardware is terminated. Next, in D60, the starting process of the OS results in terminating the system resetting process. Table 1 lists a summary of fault processing operations in this embodiment.

TABLE 1

| P0 Fault | P1 Fault | Fault Recovery Processing | Is Process Continuation Made Possible? |
|---|---|---|---|
| TLBD, CACHE I | TLBD CACHE I CACHE D not detected | Processor Reset (PRST) | Yes |
| CACHED | TLBD CACHE I CACHE D not detected | System Reset (SRST) | No |
| not detected | TLBD CACHE I CACHE D not detected | System Reset (SRST) | No |

Next, the description will be directed to a second embodiment of the present invention.

The second embodiment is concerned with further detailed classification of data cache faults in the first embodiment.

In the second embodiment, the arrangements of the TLB and the cache will be briefly described. Then, the cache state register DREG will be described. Last, the machine-check processing program will be described.

Figure 7:
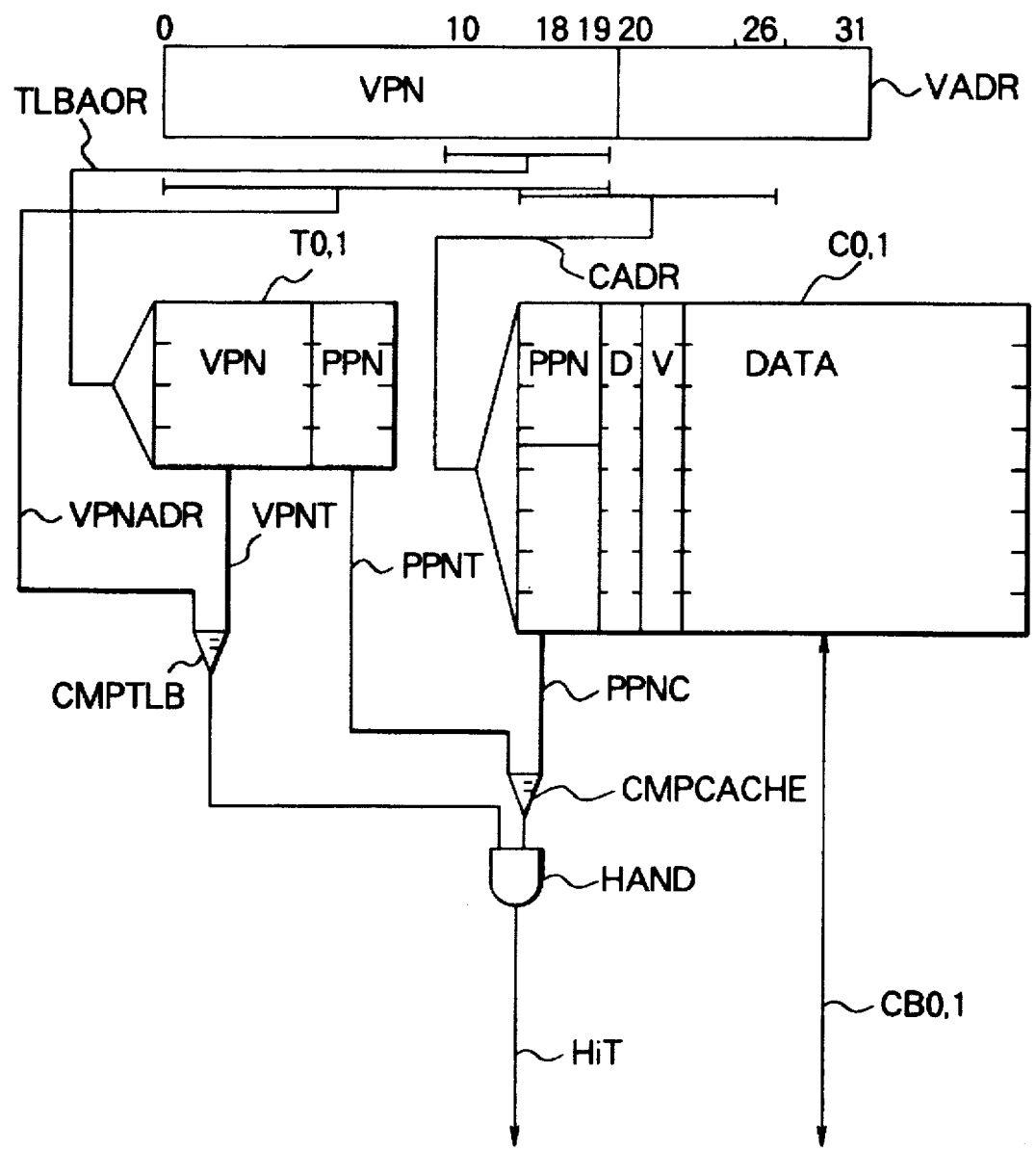
FIG. 7 is a diagram showing a cache and a TLB according to the first embodiment of the present invention.

FIG. 7 shows arrangements of the TLB and the cache, in which an instruction cache has the same arrangement as a data cache. Herein, VADR is a virtual address (32-bit length). VPN is a virtual page number (0 to 19 bits), 20 to 31 bits of which correspond to a physical address. T0 and T1 indicate TLBs and C0, 1 indicate caches. The TLB is composed of a pair of a virtual page vpn and a physical page ppn. The cache is composed of the physical page ppn, a D-bit section indicating the state of each line of the cache, a V bit section indicating a valid/invalid for each line of the cache, and a DATA section consisting of each cache line.

Next, the description will be directed to the routine for writing the data to the cache with the VADR.

To access the TLB, 10 to 19 bits of the VADR are used. Since the TLB has a 10-bit length, the number of entries in the TLB is 1024. As a result, one entry is selected from the TLB and VPN and PPN are read from the entry and then applied to the data lines VPNT and PPNT. The comparator circuit CMPTLB serves to compare the address lines VPNADR and VPNT of the VPN of the VADR with each other and output the compared result to the AND circuit HAND. With the address line CADR corresponding to 18 to 26 bits of the VADR, only one entry of the caches C0, 1 is selected so that the PPn and the data DATA of the entry may be applied to the data line PPNC and CB0, 1, respectively. The comparator circuit CMPCACHE serves to compare the data lines PPNT with PPNC and output the compared result to the AND circuit HAND. If the AND circuit HAND has an output of "1", it means that the cache is hit. The HIT signal and the data DATA are then transferred to the processor. When the HIT signal has a value of "1", the processor serves to merge DATA and data and rewrite the merged data to the cache r 1 and set the corresponding D bit to "1" indicating that the cache line may be rewritten. This is the end of writing data to the cache. To indicate a data mismatch between the cache and the main memory, a D bit is held inside of the cache.

Figure 8:
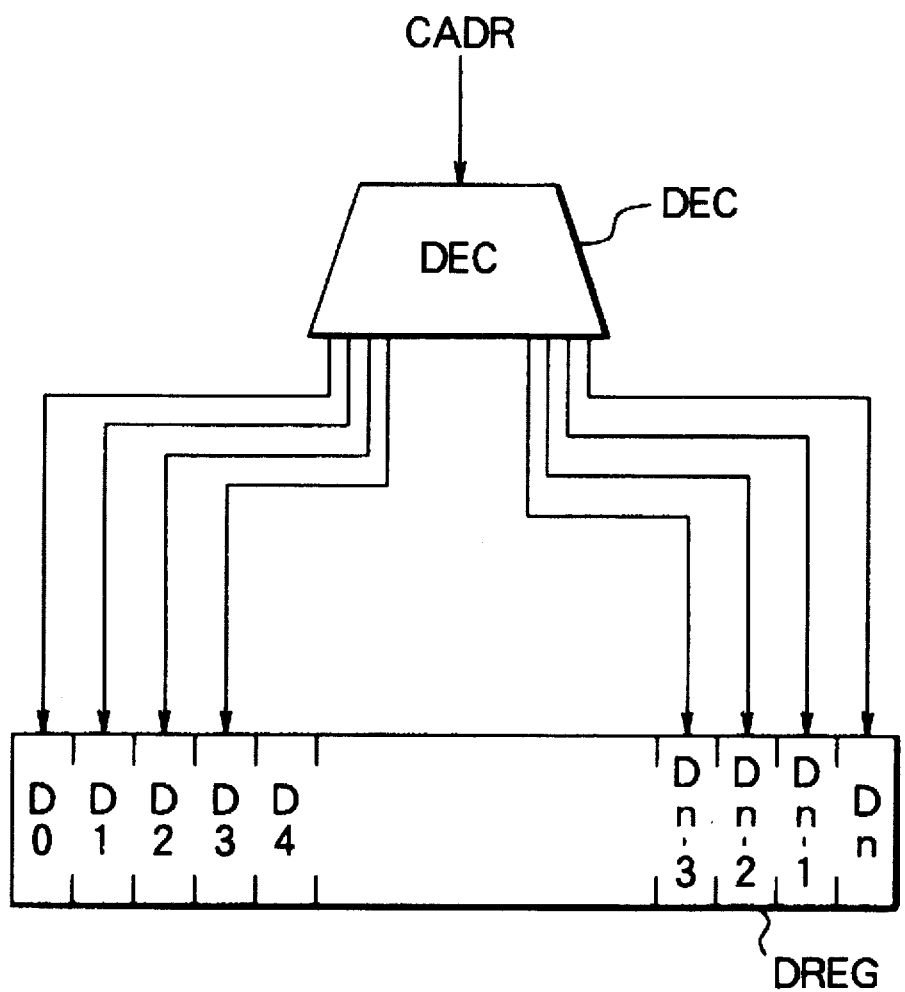
FIG. 8 is a diagram showing a cache state register according to the first embodiment of the present invention.

As stated above, a fault is likely to occur in the memory section in the cache or the TLB. Hence, the cache state register DREG shown in FIG. 8 is dualized inside of the processor for enhancing the reliability of the process and making continuation of the process as long as possible. DEC denotes a decoder circuit for decoding the address line CADR for accessing the cache. DO to Dn denote D-bit information corresponding to each entry of the data cache. In this example, each bit of the DREG corresponds to each entry of the cache in a one-to-one relation. Since the cache state register DREG is too large, the DREG arrangement is arranged so that each of the entries of the cache may correspond to one bit of the DREG. If the D bit is "1" in one of the entries, the D bit corresponding to the DREG is required to be set to a value of "1".

FIG. 9 shows the machine-check reporting program provided with the cache state register DREG as described above. The detail of the operating flow is analogous to that shown in FIG. 4. Hence, it will be briefly described. E10 denotes a process for saving the PSW and the general-purpose register in the main memory address T00. They are referenced when the process may be continued. E20 denotes a process for clearing the machinecheck reporting circuit MCKC. E30 denotes a process for determining if the check latch CL holds a value of "0". If yes, the processes from E140 to E180 are executed so as to reset the system. If no, at the E40, the machinecheck report is suppressed and the REG is cleared at E50. Next, at E60, if the TLBD bit of the fault factor register ERi (i=0 or 1) of the processor is "1" or the CACHEI bit is "1", at E70, a value of "1" is added to the REG. Then, the process at E80 is executed. At E80, it is determined whether or not the CACHED bit of the ERi is "1". If yes, at E90, 18 to 26 bits of the fault address are set to N and then the process at E100 is executed. In E100, it is determined whether or not the N bit of the DREG is "0". If yes, a value of 2' is added to the REG and the process at E130 is executed. If no, a value of 4 is added to the REG and the process at the E130 is executed. At the E130, it is determined whether or not the REG holds a value of "0". If yes, at E140, the CL is cleared. Then, at E150, all of the contents is flashed from the cache. At E160, all the TLB is purged. Next, at E170, the machine-check report is released. Proceeding to E180, a reset command RESET is written to the system reset register SRST. On the other hand, if no, at E190, it is determined whether or not the REG holds a value of "1", "2" or "3". If yes, it indicates that the detected fault is light. At E200, all of the contents is flashed from the cache. At E210, all the TLB is purged. At E220, the machine-check report is released. At E230, the reset command RESET is written to the processor reset register PRST. On the other hand, if no, at E240, it is determined whether or not the REG holds a value of "4" or "5". If yes, at E250, the fault factor register ERi, the cache state register DREG and the fault address are written to the main memory MM. Then, the processes from E140 to E180 are executed. If, on the other hand, no at E250, the processes at E140 to E180 are executed.

This is the end of the description of the master processor P0 fixed type fault processing operation arranged based on the cache state register DREG. The summary of the fault processing operations according to the present embodiment is listed in

TABLE 2

| P0 Fault | P1 Fault | Fault Recovery Processing | Is Process Continuation Made Possible? |
|---|---|---|---|
| TLB D CACHEI, CACHED (c) | TLB D CACHEI CACHED (d) Not detected | Processor Reset (PRST) | Yes |
| CACHED (d), Not detected | TLB D CACHEI CACHED (c) CACHED (d) Not detected | System Reset (SRST) | No |

In the Table 2, the CACHE(c) indicates a clean state in which the state of the cache line coincides with the state of the main memory. The CACHE(d) indicates a dirty state in which the state of the cache line does not coincide with the state of the main memory.

That is, by referring to the cache state register DREG, the process is allowed to continue only by resetting the process if a fault occurs in the data cache. This is because the fault is determined to be in a clean state from the cache state register DREG. The number of faults allowing the process to continue is increased by referring to the DREG.

Next, the description will be directed to a third embodiment of the present invention.

Figure 10:
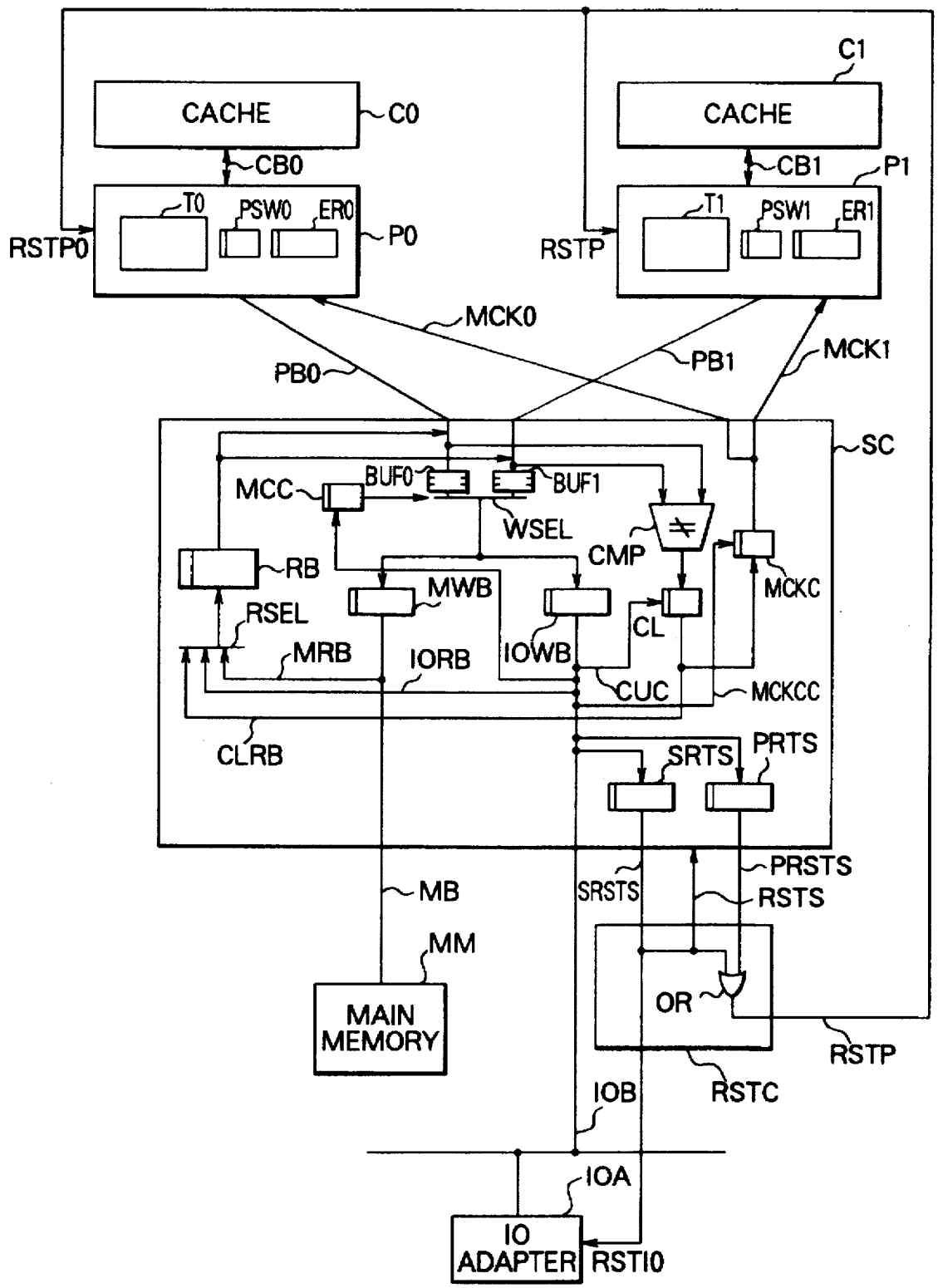
FIG. 10 is a block diagram showing an overall arrangement of hardware according to the second embodiment of the present invention.

The third embodiment is a system allowing the master processor to switch from the P0 to the P1 according to the fault level. FIG. 10 shows a hardware arrangement of this embodiment. FIG. 11 is a flowchart showing a processing flow of the machine-check processing program for doing the main process of this embodiment.

The hardware arrangement shown in FIG. 10 has an addition of a pair of buffers BUF0 and BUF1 to the inside of the system control LSI (SC). By holding the output data of the two processors in the buffers, respectively, it is possible to prevent loss of the output data by switching the master processor from the P0 to the P1. This is because when data is output by flashing the cache, the corresponding cache line is nullified and thus the data on the cache line has to be held in the buffers BUF0 and BUF1. The other components of this embodiment are likewise to those shown in FIG. 1. Hence, the description about them is left out of the description of FIG. 10.

FIG. 11 shows a machine-check processing program which enables the master program to switch from the P0 to the P1.

F10 is a process for saving the PSW and the general-purpose register to a memory address indicated by a variable T. The variable T has a preset memory address T00 for saving a processor state of the master processor P0. On the other hand, a memory address for saving the processor state of the checker processor P1 is denoted by T01. Then, based on the assumption, the processing flow will be described later. The state of the processor (PSW, general-purpose register) is saved at the memory address T. Then, an F20, the machine-check reporting circuit MCKC is cleared. Next, at F30, it is determined whether or not the check latch CL holds a value of "0". If yes, the processes from G10 to G60 are executed for resetting the system. If no, at F40, the machine-check report is suppressed. Then, at F50, it is determined whether or not the TLBD bit of the fault factor register ERi (i=0 or 1) is "1" or the CACHEI bit is "1". If yes, a value of "1" is added to the REG (F60) and the process at F70 is executed. If no, the process at F70 is executed. At F70, it is determined whether or not the CACHED bit is "1". If yes, a value of "2" is added to the REG (F80) and the process at F90 is executed. If no, the process at F90 is executed. Then, the fault factor is determined. At first, at F90, it is determined whether or not the REG holds a value of "0". If yes, a value of "10" is set to the REG (F100). Then, the memory address T01 for saving the processor state of the checker processor P1 is set to the variable T (F110). The processes at H10 and H20 are executed. H10 denotes a process for releasing a machine-check report. H20 denotes a process for forcibly generating a machine-check report and switching the selector WSEL to the master checker control circuit. As a result of the process at H20, after the processors P0 and P1 execute the process shown in FIG. 3 again, the processors P0 and P1 operate to execute the machine-check processing program shown in FIG. 11. The checker processor P1 switched by the selector WSEL executes the machine-check processing program. As described above, the feature of this program is: when the fault factor is not detected, it is determined if the fault factor can be logged to the checker processor P1. In the determination at F90, if no, the process at F120 is executed. At F120, it is determined whether or not the REG holds a value of "1". If yes, the processes at I10 to I50 are executed for resetting the processor. If no, the process at 140 is executed. At F140, it is determined whether or not the REG holds a value of "2" or "3". If yes, a value of "100" is set to the REG (F150). The memory address T01 for saving the processor state of the checker processor P1 is set to the variable T (F160). Next, the processes at H10 and H20 are executed so that the processor may be switched to the checker processor by the selector WSEL. Then, the machine-check processing program is executed again. If no, the process at F170 is executed. At F170, it is determined whether or not the REG holds a value of "10". If yes, a pair of processors P0 and P1 do not still detect any fault. Hence, the system is reset (G10 to G60) for preventing the erroneous data from being written. If no, the process at F180 is executed. At F180, it is determined whether or not the REG holds a value of "11", "12" or "13". If yes, a value of "0" is set to the master-checker control circuit MCC for switching the selector circuit WSEL. Again, the processor is changed to the master processor P0 (F190). Next, the processes at I10 to I50 are executed for resetting the processor. If no, the process at F200 is executed. At F200, it is determined whether or not the REG holds a value of "100" or "101". If yes, the processes at I10 to I50 are executed in the state where the processor to be checked is a checker processor P1, for resetting the processor. If no, the process at F210 is executed. At F210, it is determined if the REG holds a value of "102" or "103". If yes, it means that a serious fault takes place in both the processors P0 and P1. At F220, after saving the ERi (i=0 or 1) and the fault address to the main memory MM, the processes at G10 to G60 are executed for resetting the system. If, on the other hand, no, the processes at G10 to G60 are executed for resetting the system. The processor resetting process and the system resetting process are as shown in FIGS. 5 and 6. The summary of fault processing operations based on a processor switching system is listed in Table 3.

TABLE 3

| P0 Fault | P1 Fault | Fault Recovery Processing | Is Process Continuation Made Possible? |
| --- | --- | --- | --- |
| TLBD, CACHEI | TLBD CACHEI CACHED Not detected | Processor Reset (PRST) | Yes |
| CACHED | TLBD CACHEI CACHED Not detected | Swith to P1 and PRST SRST Switch to P1 and PRST | Yes No Yes |
| Not detected | TLBD CACHEI CACHED Not detected | PRST ___ SRST | Yes ___ No |

The processor switching system is different from other systems, because the fault factor of the checker processor is determined. Even when no fault is detected in P0, if a light fault factor is detected in P1, the processor resetting is made possible (the processing may be continued).

Note that in the third embodiment, the description was directed to the process for resetting the processor or resetting the system on the assumption that the fault factors of the master and the checker processors are determined. However, as shown in FIG. 11, for example, at F200, if the REG holds a value of "100", either a serious fault takes place in the master process or no fault takes place in the checker processor. Hence, the master processor may be separated so that only the checker processor may be constantly operated as a single processor. Specifically, as shown in FIG. 10, by selecting the BUF1 and selecting the output data of the checker processor, the process can be continued with a single processor. Likewise, at F120 in FIG. 11, after being switched to the checker processor, if the REG holds a value of "1" again, a light fault occurs in the master processor and no fault occurs in the checker processor. Hence, a single processor processing can be carried out by the checker processor alone, as in the above case.

This is the end of the description of the fault processing operation based on the master processor P0 switching system.

Last, the summary of the fault processing operations to be executed in the combination of the cache state register and the master processor switching system is listed in Table 4.

TABLE 4

| P0 Fault | P1 Fault | Fault Recovery Processing | Is Process Continuation Made Possible? |
|---|---|---|---|
| TLBD, CACHEI CACHED (c) | TLBD CACHEI CACHE (c) CACHE (d) Not detected | Processor Reset (PRST) | Yes |
| CACHED (d) | TLBD CACHEI CACHE (c) | Switch to P1 and PRST | Yes |
| | CACHE (d) Not detected | System Reset (SRST) Switch to P1 and PRST | No — |
| Not detected | TLBD CACHEI CACHE (c) | Processer Reset (PRST) | Yes Yes |
| | CACHE (d) Not detected | — SRST | — No |

As will be easily understood from the Table 4, the combination of the cache state register and the processor switching system makes it possible to increase the number of faults allowing the process to continue.

Figure 12:
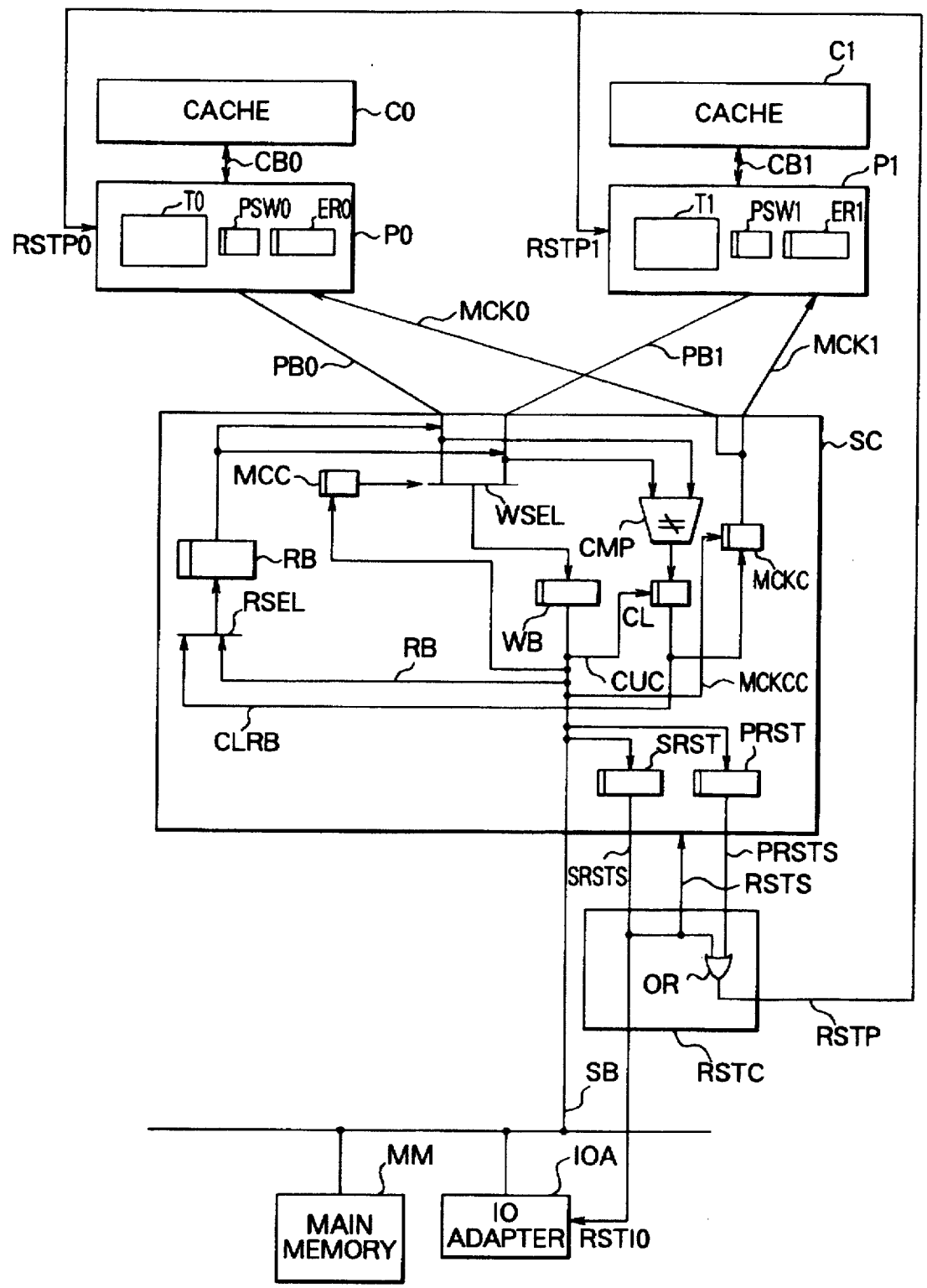
FIG. 12 is a block diagram showing an overall arrangement of hardware according to the second embodiment of the present invention.

FIG. 12 shows a hardware arrangement when the system control LSI has three paths. The difference in the arrangement from that shown in FIG. 1 is: two write data buffers MWB and IOWB are composed of just one buffer WB and are connected to the system bus SB. The main memory MM is connected to the system bus SB. Further, the read data selector circuit is a two-to-one selector circuit for selecting the output data of the check latch CL and the data of the system bus. The other components of the arrangement shown in FIG. 12 are the same as those shown in FIG. 1. Hence, the description of those components is not included in the description of FIG. 12.

In the foregoing illustration, the system control LSI has two processor buses connected thereto so that the system control LSI may compare the output of the processors with each other.

The later description will be directed to an embodiment for realizing a fault recovering process with duplicated processors in the other device arrangement in which the checker processor performs the comparison check.

Figure 14:
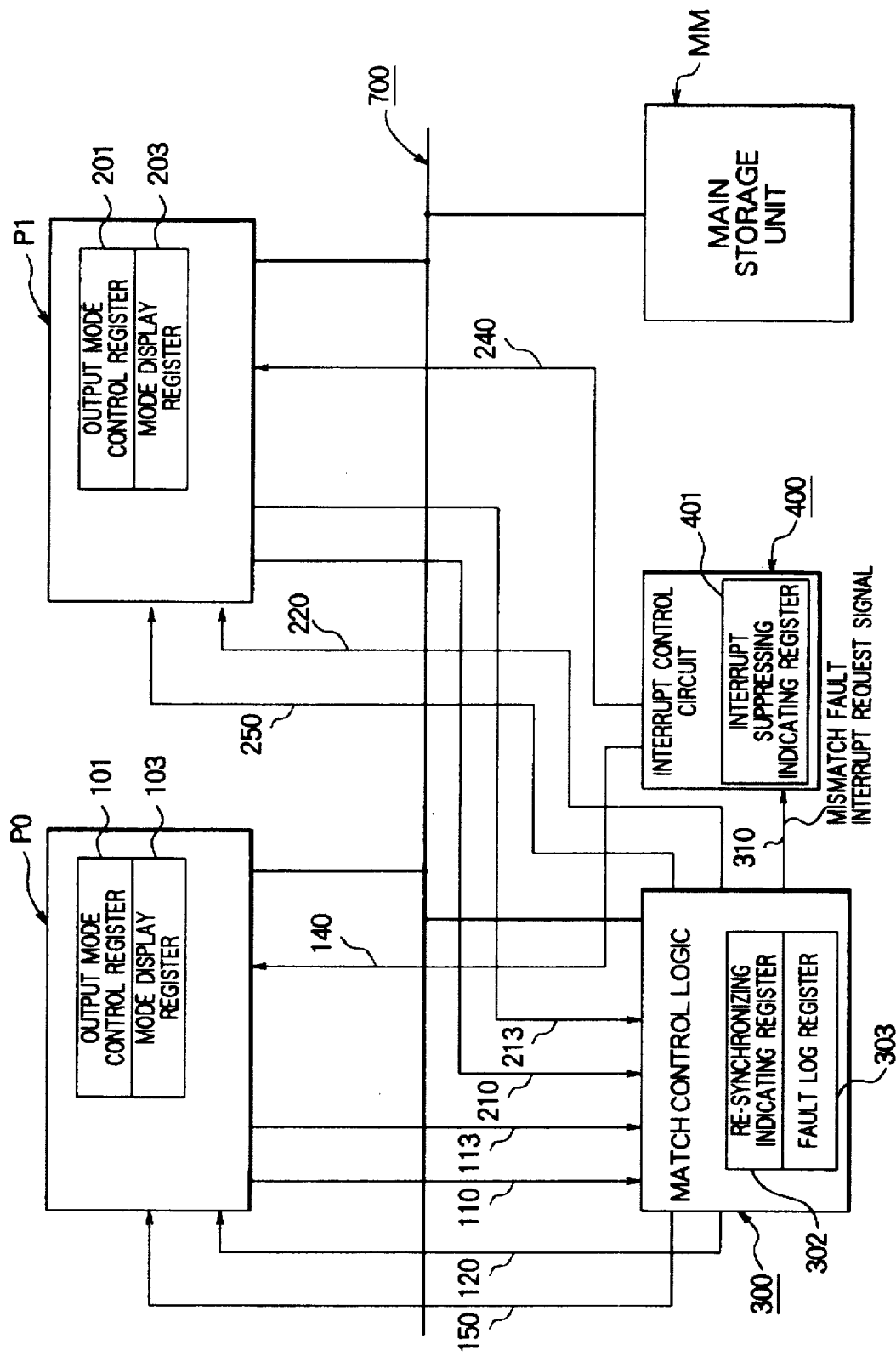
FIG. 14 is a block diagram showing an overall arrangement of hardware according to a third embodiment of the present invention.

FIG. 14 is a block diagram showing an arrangement of a fourth embodiment of the invention.

In this embodiment, processors P0 and P1, a match control logic 300 and a main memory MM are connected on a data bus 700. The processors P0 and P1, the match control logic 300 and an interrupt control circuit 400 are connected through various signal lines.

In FIG. 14, the processors P0 and P1 read the same data from the bus 700 and perform a similar process. According to this embodiment, the processors P0 and P1 provides mode display registers 103 and 203, respectively, for indicating the current operating mode of the processor so that the processor may be operated in a master mode or a checker mode. Each of the mode index registers 103 and 203 is composed of one bit, for instance, in a manner that "1" may be set to the master mode and "0" may be set to the checker mode.

When the processor P0 or P1 is in the master mode, the processor P0 or P1 executes the process and outputs the processed result to the bus 700. When the processor is in the checker mode, the processor serves to suppress the output to the bus 700, read the processed result output from the processor in the master mode onto the bus 700, and compare the read processed result with the processed result suppressed to be output. When a mismatch is detected, the processor serves to output a mismatch fault detection display signal 113 or 213 to the match control logic 300.

Switching of the operating mode is carried out by setting the mode display register 103 or 203 according to an indication of master mode/checker mode indication signal 120 or 220 (referred to as an M/C mode indication signal 120 or 220) outputted from the match control logic 300.

When a fault occurs, the processor P0 or P1 serves to output the fault as an internal fault display signal 110 or 210 to the dualizing control circuit 300. Like the first embodiment, the signals may be temporarily stored as log information in the ER0, 1 in which a fault occurred.

The match control logic 300 is a circuit for controlling the modes of the processors P0 and P1. The match control logic 300 receives internal fault display signals 110, 210 and mismatch fault detection display signals 113, 213 and specifies the processor in which a fault takes place based on the received signals. The circuit 300 serves to output the M/C mode indication signal 120 or 220 according to the specified result for controlling the mode of the processor P0 or P1.

Then, the received fault display signal may be set to a fault log register 303. The match control logic 300 further provides a re-synchronization indication register 302 for indicating re-synchronization indication of the processor P0 or P1 in which a mismatch is dectected.

The interrupt control circuit 400 operates to report a fault interrupt given by an interrupt signal from a peripheral I/O device (not shown) and a mismatch fault interrupt request signal 310 from the match control logic 300 to each of the processors P0 and P1 as fault interrupt signals 140 and 240.

The interrupt control circuit 400 includes an interrupt suppressing indication register 401 for indicating suppressing of all the interrupts for the processor P0 or P1.

The recovering operation to be done when a fault occurs in the foregoing arrangement will be described in referring to FIGS. 15 and 16.

Figure 15:
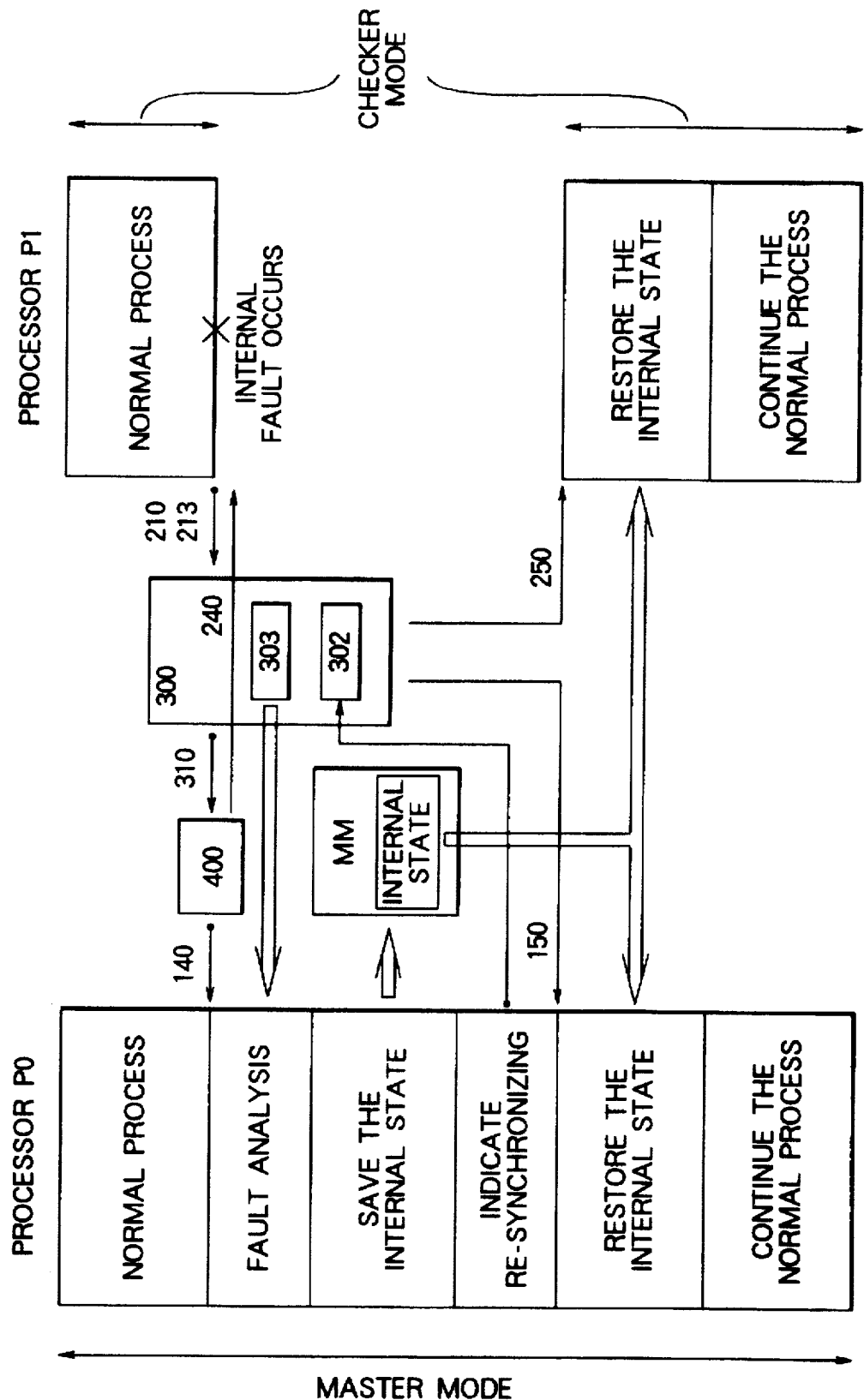
FIG. 15 is a flowchart showing a process executed when a fault occurs in a processor in a checker mode in the hardware shown in FIG. 14.
Figure 16:
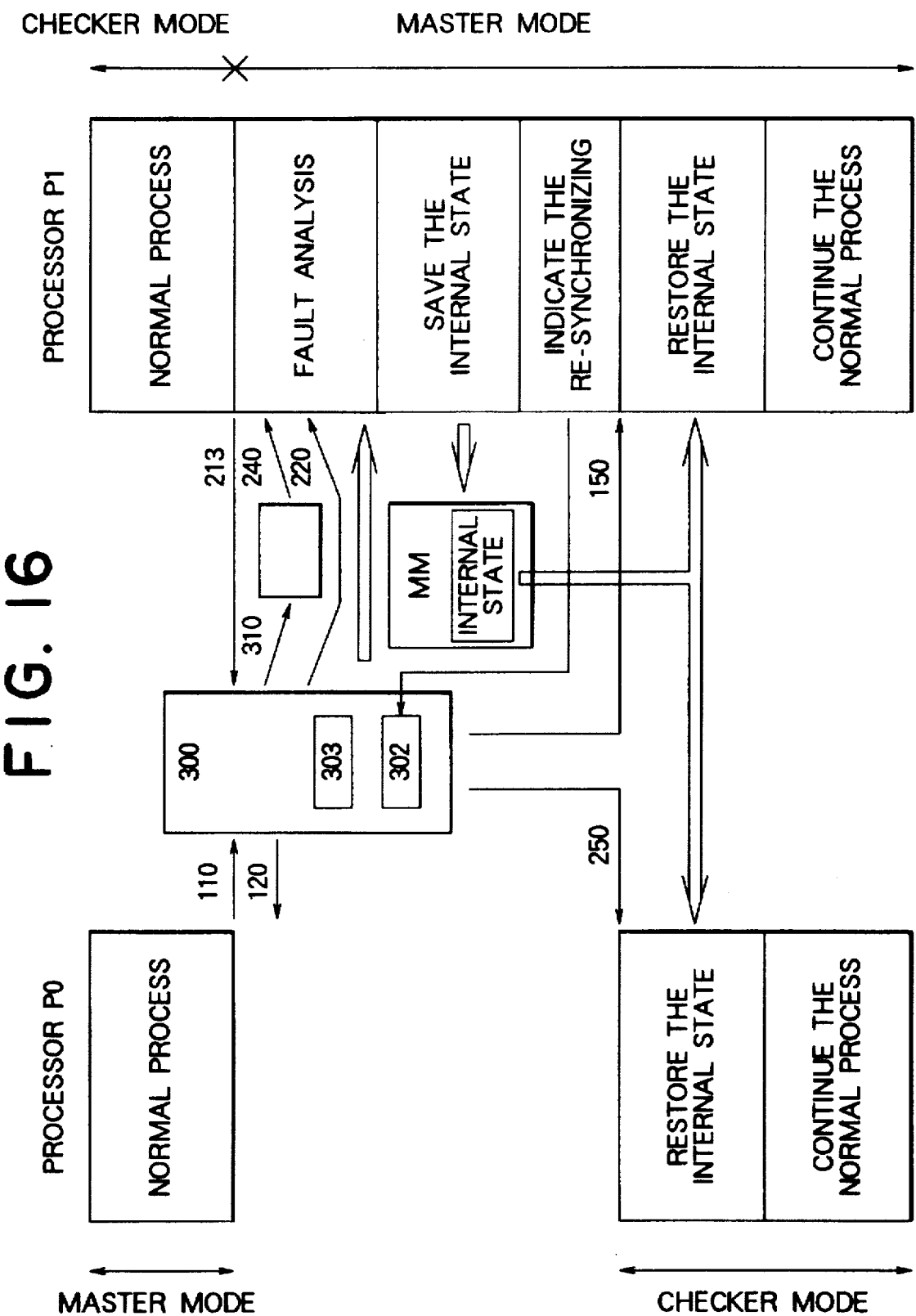
FIG. 16 is a flowchart showing a process executed when a fault occurs in a processor in a master mode in the hardware shown in FIG. 14.

FIG. 15 shows a processing operation in the arrangement where the processor P0 is in the master mode, the processor 21 is in the checker mode and an internal fault takes place in the processor P1.

(1) When the processor P1 detects that an internal fault occurs in itself, the processor P1 serves to output the internal fault display signal 210 to the match control logic 300. When an internal fault occurs, the processed result of the processor P0 is shifted out of synchronism with the processed result of the processor P1. Hence, the processor P1 can detect a mismatch of the result output to the bus 700. If this mismatch is detected, the processor P1 serves to output the mismatch fault detection display signal 210 to the match control logic 300.

(2) The match control logic 300 recognizes that a fault occurs in the processor P1 in response to the internal fault display signal 210 and the mismatch fault detection display signal 213. In this embodiment, since a fault occurs in the checker mode processor P1, the mode switching is not carried out. Further, a log of the internal fault display signal 210 is stored in the fault log register 303 so that a flag may be set to the register 303.

Next, the match control logic 300 issues the mismatch fault interrupt request signal 310 to the interrupt control circuit 400 and requests a fault interrupt for the processors P0 and P1.

The interrupt control circuit 400 sets a flag to the interrupt suppressing indication register 400 in response to a request for a fault interrupt and issues an interrupt signal 140 or 240 to the processor P0 or P1 for performing a fault interrupt.

After the match control logic 400 reports a mismatch fault, the circuit does not report any fault if the next mismatch fault detection display signal 213 is detected until a re-synchronizing indication is given (that is, when a flag is set in the fault log register).

(3) The processor P0 operating at the master mode in response to the fault interrupt through the interrupt signal 140 serves to read the content of the fault log register 303 from the match control logic 300 and analyze the content of the fault. In this case, the processor P0 recognizes that an internal fault occurs in the processor P1 and the processor P0 is shifted out of synchronism with the processor P1 for the internal fault.

The processor P1 operating in the checker mode does not perform any process for a fault interrupt if any exists.

(4) The processor P0 serves to save the internal state (contents of the program counter and the general-purpose register) of the processor P0 required for re-opening the process to the main storage unit 600 after it recognizes the fault.

(5) Next, the processor P0 issues a request for a re-synchronizing indication to the match control logic 300 in order to synchronize with the processor P1 again.

The match control logic 300 sets re-synchronization indication information in the re-synchronization indication register 302 and outputs synchronous reset indication signals 150 and 250 so that the processors P0 and P1 are reset in synchronism. Further, the match control logic 300 initializes the flag in the fault log register 303.

(6) In response to the synchronous reset indication signals 150 and 250, the processors P0 and P1 serve to restore from the main storage unit 600 the internal state of the processor P0 which existed before the processors P0 and P1 were shifted out of synchronism with each other. By virtue of such, the process when a mismatch fault occurred is continued in the previous duplex arrangement existed before the fault occurrence, namely, the arrangement where the processor P0 is in the master mode and the processor P1 is in the checker mode.

Next, the processing operation to be done when an internal fault occurs in the processor P0 operating in the master mode will be described in referring to FIG. 16.

(1) When the processor P0 detects an incorrectable internal fault, the processor P0 outputs the internal fault display signal 110 to the match control logic. At this time, the processor P0 is shifted out of synchronism with the processor P1. Hence, the processor P1 in the checker mode detects a mismatch between the outputs of the processors P0 and P1 given onto the bus 700 and outputs the mismatch fault detection display signal 213 to the match control logic 300.

(2) The match control logic 300 recognizes that a fault occurs in the processor P0 in the master mode in response to the internal fault display signal 110 and the mismatch fault detection display signal 213. The circuit 300 determines that the mode switching is required, outputs the M/C mode indication signals 120 and 220 and issues an indication for switching the processor Pi having no detected fault to the master mode and the processor P0 having a detected fault to the checker mode.

The circuit 300 picks up a log from the fault log register 303 and sets a flag to the register 303. Then, the mismatch fault interrupt request signal 310 is output to the interrupt control circuit 400. Then, the circuit 300 issues a fault interrupt for the processors P0 and P1.

The interrupt control circuit 400 outputs an interrupt signal 240 for performing a fault interrupt for the processors P0 and Pi.

(3) When the processor P1 operates in the master mode in response to a report for a fault interrupt, the processor P1 reads the content of the fault log register 303 from the match control logic 300 and analyzes the content of the read fault. As a result, the processor P1 recognizes that the processor P0 is shifted out of synchronism with the processor 20, because of an internal fault in the processor P0.

(4) The processor P1 having recognized the asynchronous procesing of the processors P0 and P1 serves to save the information about an internal state of the processor P1 to the main storage unit 600.

(5) Subsequently, the processor P1 outputs a re-synchronous indication to the match control logic 300 so as to re-synchronize the processor P1 with the processor P0. The match control logic 300 serves to synchronize the processors P0 with P1 by using the synchronous reset indication signals 150 and 250.

(6) The processors P0 and P1 which come into a synchronous state again serve to restore the internal state which existed before occurrence of a fault of the processor P0 from the main storage unit so that the process is continued which was being carried out when the mismatch fault took place, in the duplex arrangement in which the processor P1 operates in the master mode and the processor P0 operates in the checker mode.

In the present embodiment, as described above, when a mismatch fault occurs because of an internal fault occurring in any one of the processors P0 and P1 operating in synchronism, the match control logic 300 identifies a fault occurring process and executes the process by using the internal state of the processor with no fault through the duplex arrangement. Hence, if the system has a RAM in which an intermittent fault is likely to occur, the events causing a system fault to happen are reduced in number, thereby enhancing the reliability of the system.

If faults occur in both of the processors, the match control logic operates to determine if the fault is serious or light and switch the processor mode according to the determined result. In this case, each processor operates to output to the match control logic the internal fault information containing information indicating where the internal fault occurs.

The summary of the fault processing operations in this embodiment is listed in Table 5.

TABLE 5

| P0 Fault | P1 Fault | Fault Recovery Processing | Is Process Continuation Made Possible? |
| --- | --- | --- | --- |
| TLBD, CACHEI | TLBD CACHEI | Reset Processor without swithing the mode (PRST) | Yes |
|  | CACHED Not detected | Switch to P1 and Reset Procecessor PRST | Yes |

TABLE 5-continued

| P0 Fault | P1 Fault | Fault Recovery Processing | Is Process Continuation Made Possible? |
|---|---|---|---|
| CACHED | TLBD | | |
| | CACHEI | | |
| | CACHED | SRST | No |
| | Not detected | Switch to P1 and Reset Processor PRST | Yes |
| Not detected | TLBD | SRST | No |
| | CACHEI | | |
| | CACHED | | |
| | Not detected | | |

(Fifth Embodiment)

Figure 17:
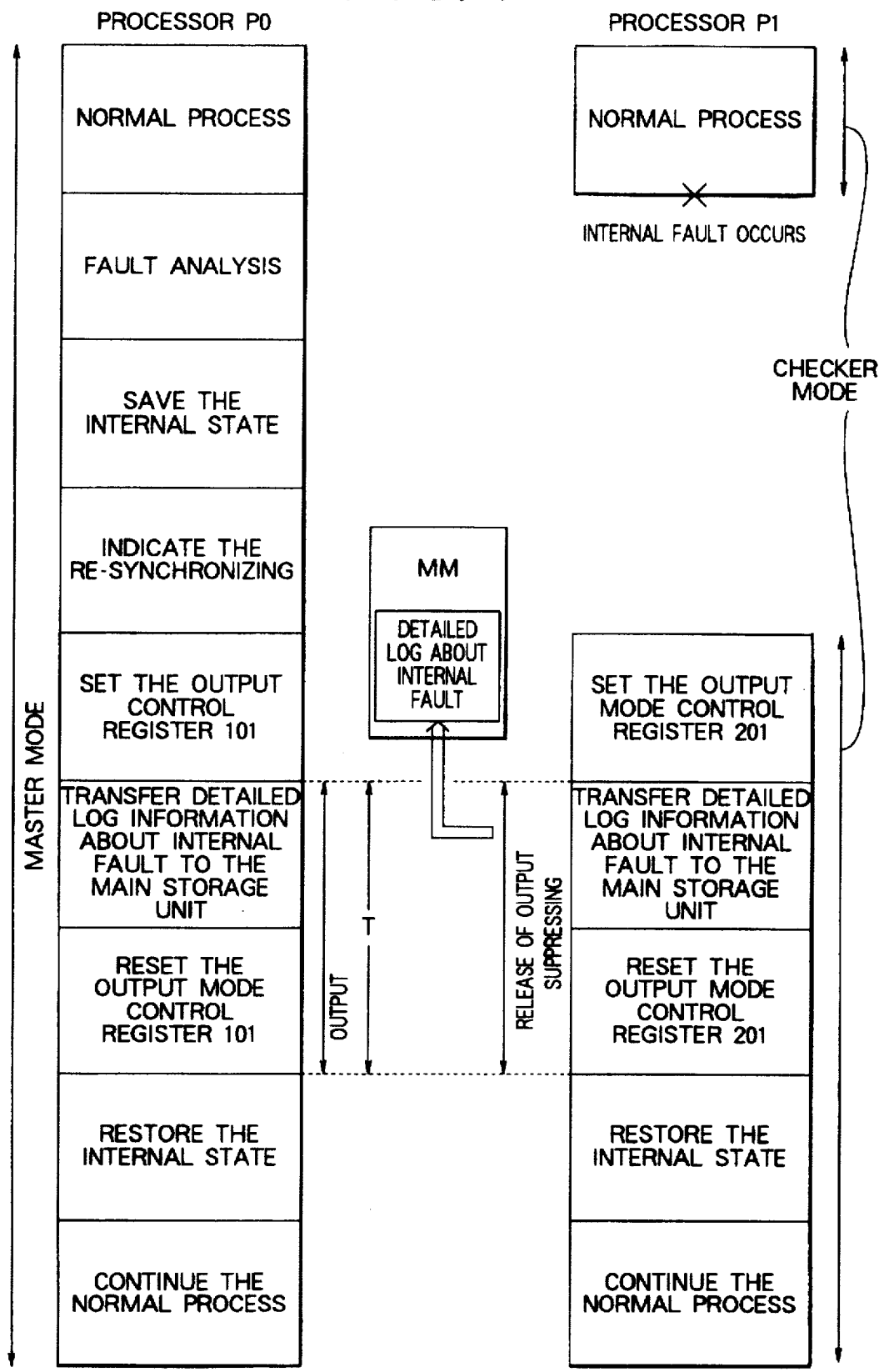
FIG. 17 is a flowchart showing a process executed when fault log information contained in the processor in a checker mode is transferred to a main storage unit.

The description will be directed to an arrangement of the fifth embodiment in which a step of obtaining detailed log information of an internal fault in the processor is added to the process provided in the fourth embodiment, by referring to FIGS. 14 and 17.

The processor P0 or P1 provides an output mode control register 101 or 201, respectively, for indicating the processors to suppress the output in the master mode or release the output in the checker mode. In response to a re-synchronizing indication from the match control logic 300, the processor P0 or P1 serves to temporarily (an interval of T shown in FIG. 17) set a value of "1" to the output mode control register 101 or 201. The processor P1 at the checker mode saves the address of the program counter when an internal fault occurs and the fault detail log information such as a fault location to the main storage unit. After saving them, the processor P1 serves to report the termination of saving them to the match control logic through a signal line (not shown). The match control logic 300 serves to output to both of the processors' signals for resetting the output mode control registers 101, 201 and the output control registers 101, 201 in synchronism. In response to the signals, each processor serves to reset the output mode control registers.

This embodiment is arranged to transfer the internal fault detail log information in the processor with a fault detected to the main storage unit 600 while keeping the synchronous state and without having to detect a mismatch fault. By analyzing the content of the main storage unit 600, the cause of the fault can be easily obtained.

(Sixth Embodiment)

In the fifth embodiment, suppose that the processors P1, P0 have means for temporarily holding an interrupt signal from the interrupt control circuit 400. In such case, if a new interrupt occurs while the internal state is saved in the main storage unit 600 and then the internal state is restored (interval of T shown in FIG. 2), the previous interrupt will be lost. Further, the processor could not recognize the loss of the previous interrupt.

In the sixth embodiment, the interrupt control circuit 400 has an interrupt suppressing indicating register 401 for indicating suppressing of an interrupt. The processor in the master mode recognizes the fault by analyzing the fault and instructs the interrupt control circuit 400 to set a flag to the interrupt indicating register 401. The interrupt control circuit 400 serves to suppress any interrupt while the flag is set to the interrupt suppressing indicating register 401. Then, the processor in the master mode issues an indication for resetting the interrupt suppressing indicating register 401 to the interrupt control circuit 400 before restoring the internal state of the processor itself.

If a request for an interrupt is received when a flag is set to the register 401, the interrupt control circuit 400 operates to hold the interrupt request in a register provided in the circuit 400. After the register 401 is reset, the circuit 400 operates to issue the interrupt request.

The present embodiment provides a capability of performing a recovering process without having to ignore the interrupt request while a mismatch fault is being recovered.

(Seventh Embodiment)

Figure 18:
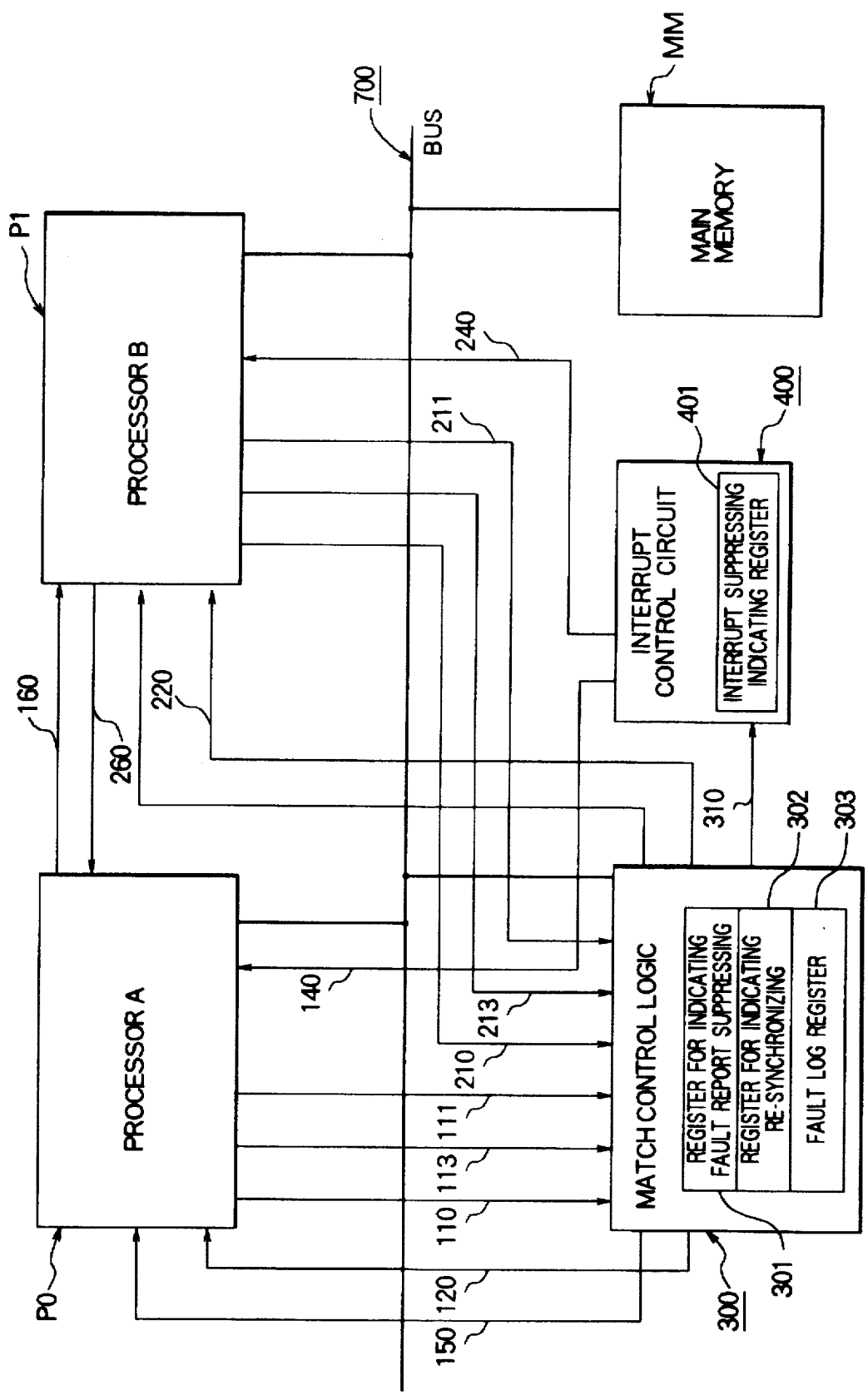
FIG. 18 is a block diagram showing an arrangement of the embodiment provided when only the processor at the master mode is operated if a fixed fault occurs.
Figure 22:
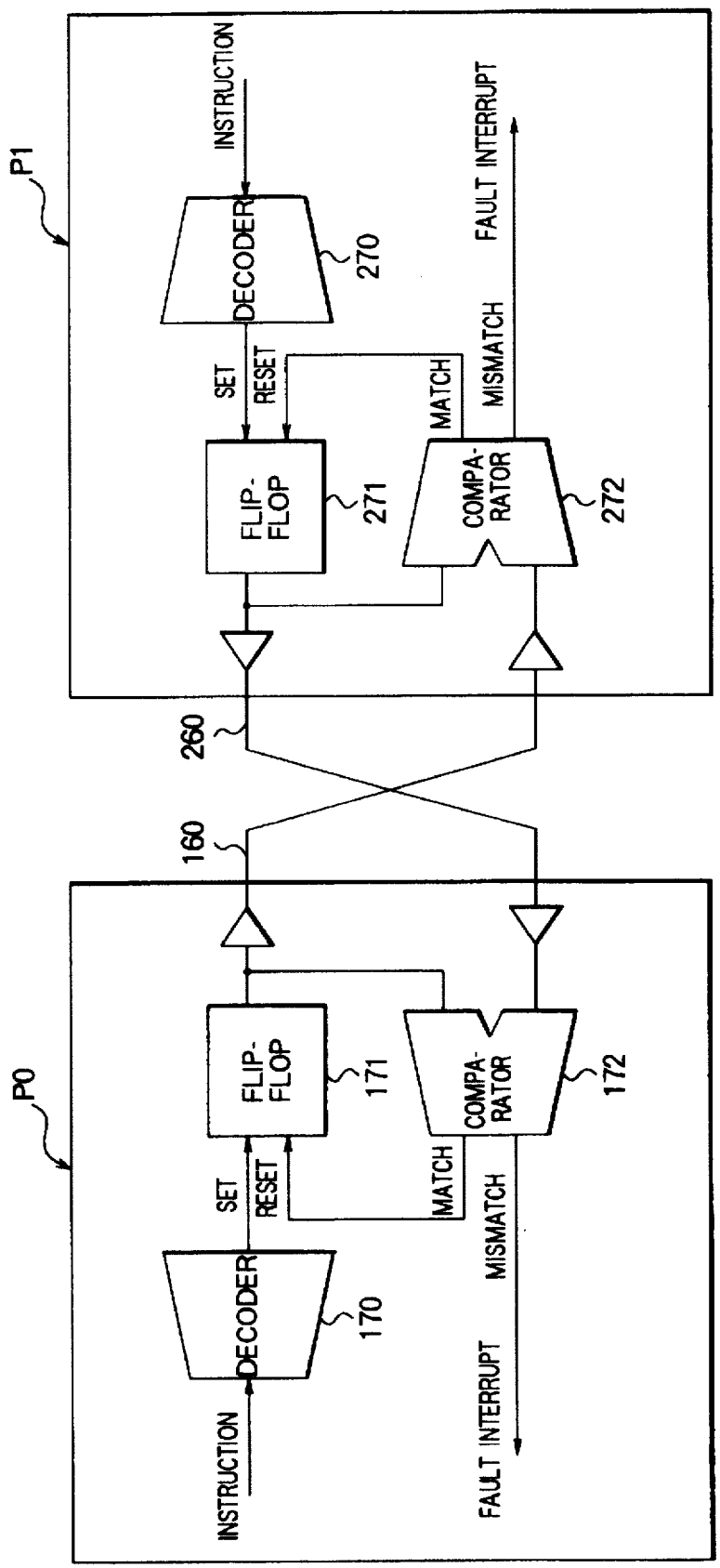
FIG. 22 is a block diagram showing a part for monitoring a synchronous state with a synchronous state indicating signal.

Next, the description will be directed to a seventh embodiment which are able to rapidly detect a synchronous fault, by referring to FIGS. 18 and 22. The processors P0, P1 operate to issue synchronous state display signals 160, 260 while the processors are in operation. The processors monitor the signals 160, 260 with each other for detecting a synchronous fault rapidly and reliably.

FIG. 22 shows an arrangement and an operation for monitoring a synchronous state. The processor P0 or P1 provides a decoder 170 or 270, a flip-flop 171 or 271, and a comparator 172 or 272, respectively. The decoder 170 or 270 decodes a specific instruction, sets the flip-flop 171 or 271 according to a signal indicating the decoded result, and outputs the signal indicating the set state as the synchronous state display signal 160 or 260 to the comparator 172 or 272. The comparator 172 compares the synchronous state display signal 160 with the signal 260 sent from the processor P1 and the comparator 272 compares the signal 260 with the signal 160 from the processor P0. If matched, the comparator 160 or 260 serves to reset the flip-flop 171 or 271, respectively. If not matched, the synchronous fault is considered to occur. A fault interrupt occurs inside of the processor so as to recover the synchronous fault in the procedure as shown in FIGS. 15 and 16.

(Eighth Embodiment)

Figure 23:
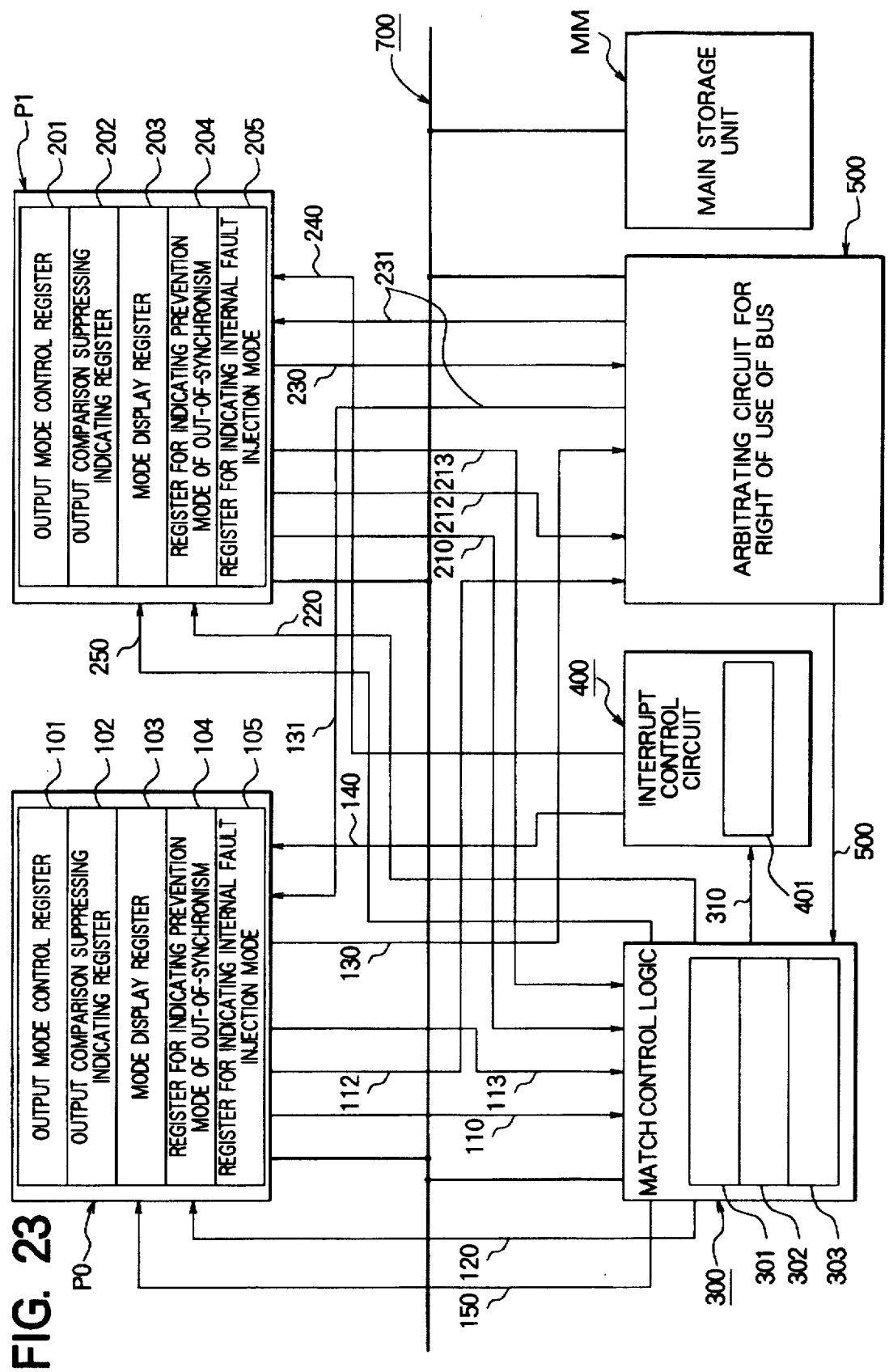
FIG. 23 is a block diagram showing an arrangement having a bus arbitrating circuit.

Next, the description will be directed to another embodiment arranged to rapidly find out a mismatch fault, by referring to FIGS. 23 and 24.

Since the processors P0 and P1 are operating in synchronism, they are supposed to request a right of use of a bus 700 at the same timing.

In the eighth embodiment, as shown in FIG. 23, there is provided a circuit for detecting a mismatch between request signals for a right of use of a bus in the circuit 500 for arbitrating a right of use of a bus. Before the processor in the checker mode detects a mismatch fault, the mismatch fault is allowed to be detected when the right of use of a bus is requested.

As shown in a time chart of FIG. 24, the processor P0 or P1 serves to output the request signal 130 or 230 for a right of use of a bus before outputting data onto the bus 700. The arbitrating circuit 500 serves to output the enabling signals 131 and 231 for a right of use of a bus to the processors according to the request signals 130 and 230 for a right of use of a bus provided in the processors P0 and P1.

At the timing t1 shown in FIG. 24, for example, a fault occurs inside of the processor P1 in the checker mode. In this case, the processor P1 is shifted out of synchronism with the processor P0 so that the processor P1 may not output the request signal 230 for a right of use of a bus. Hence, the request signals 130 and 230 for a right of use of a bus are not made to be identical to each other.

If a mismatch is detected, the arbitrating circuit 500 serves to output a mismatch display signal 510 for a request of a right of use of a bus to the match control logic 300.

In response to the mismatch display signal 510, the match control logic 300 serves to pick up log information in the fault log register 203 and output a mismatch fault interrupt request signal 310 to the processors P0 and P1 for requesting a fault interrupt. The interrupt control circuit 400 serves to perform a fault interrupt to the processors P0 and P1 by using the interrupt signals 140 and 240, respectively.

According to this embodiment, when the request for a right of use of a bus is output before the processor in the master mode outputs the data onto the bus 700, it is possible to detect a shift of synchronism without having to add a special signal. Hence, the fault detection is allowed to speed up.

(Ninth Embodiment)

The description will be directed to an embodiment which is arranged to identify an internal fault into a correctable internal fault such as a 1-bit error of ECC as in a cache or TLB (in which state though the internal states of the general-purpose registers or the like are identical to each other, both of the processors are shifted out of synchronism with each other) to be corrected by the hardware inside of the processor or an incorrectable internal fault such as a parity error or a 2-bit error of ECC as in a cache or TLB to be corrected by the software but not to be corrected by the hardware and to quite easily operate both of the processors in synchronism when the correctable internal fault occurs, by referring to FIGS. 23 and 25.

In the eighth embodiment, the ER0, 1 in each of the processor further stores information indicating if the fault is a correctable internal fault or an incorrectable internal fault. If the fault is a correctable one, the processor with the fault detected operates to output correctable internal fault display signals 112 and 213 to the arbitrating circuit 500.

As shown in a time chart of FIG. 25, in the processor P1 in the checker mode, a correctable internal fault occurs at a timing t1 so that the timing when the processor P1 outputs the enabling signal 230 for a right of use of a bus is delayed by a Td time than the timing when the processor P0 outputs it. In this state, both of the processors are shifted out of synchronism with each other.

At this time, the processor P1 outputs the correctable internal fault display signal 212 to the arbitrating circuit 500. After receiving the signal 212, the arbitrating circuit 500 does not output the mismatch display signal 510 for a request of a right of use of a bus if it operates to detect a mismatch between the request signals 130 and 230 for a right of use of a bus. At this time, the arbitrating circuit 500 suppresses outputting of the enabling signal for a right of use of a bus to the processor with no fault detected until it receives the request signal for a right of use of a bus from the processor with the fault detected and then outputs the enabling signals 130 and 230 for a right of use of a bus to both of the processors at a time at the timinq t2.

According to the present embodiment, if the correctable internal fault occurs, both of the processors are allowed to be quite easily synchronized with each other without having to operate the match control logic 300 for the recovering Process.

(Tenth Embodiment)

Next, the description will be directed to an embodiment which is arranged to obtain detailed information about a fault if it is a correctable internal fault, with reference to FIGS. 23 and 26.

Even when the processors are easily synchronized with each other though the correctable internal fault has occurred, it is possible to pick up a detailed factor about the fault without having to keep the synchronizing state and detect a mismatch fault.

If the correctable internal fault occurs in the processor P0 in the master mode, the function of detecting a mismatch fault in the processor P1 in the checker mode is suppressed. Conversely, if a correctable internal fault occurs in the processor P1 in the checker mode, the output from the processor P0 in the master mode is suppressed and the suppressing of the output of the checker processor P1 is temporarily released.

As shown in FIG. 23, for that purpose, the processor P0 or P1 provides an output comparison suppressing register 102 or 202 for temporarily suppressing the function of detecting a mismatch fault.

Further, the signal lines are provided for outputting the correctable internal fault display signals 112 and 212 to the arbitrating circuit 500 and the match control logic 300.

If a correctable internal fault occurs in the processor P0 at the master mode, the processor P0 serves to output the correctable internal fault display signal 112 to the match control logic 300 and set a value of "1" to the register 102.

In response to the correctable internal fault display signal 112, the match control logic 300 recognizes that the fault detected in the processor P0 is a correctable internal fault and stops to output the M/C mode indication signals 120 and 220 though the fault occurs in the processor in the master mode. That is, the processor P0 serves to recover the fault as keeping itself at the master mode. When another internal fault takes place, likewise, the match control logic 300 sets the fault log information and interrupts the processors P0 and P1.

In response to the interrupt signal, the processor P0 or P1 serves to read the content of the fault log register 303 and analyze the read fault. If the fault is recognized to be a correctable internal fault, the processors operate to set a value of "1" to the registers 102 and 202, respectively, with their internal instruction trains so as to keep the output comparison suppressed. The processor P1 in the checker mode sets a value of "1" to the register 202 so that the processor P1 may not detect a mismatch fault. The master processor P0 with a fault detected operates to transfer the detailed log information about an internal fault and then to send a transfer-terminating signal to the match control logic after transfer of the information is terminated. The match control logic 300 operates to output to the processors P0 and P1 a signal for resetting the registers 102 and 202. Both of the processors operate to reset the registers 102 and 202 and then return to the ordinary process.

According to the present embodiment, the detailed log information inside of the processor is kept synchronous when a correctable internal fault has occurred. The log information is transferred to the main storage unit 600 without having to detect any mismatch fault and then can analyze the cause of the fault.

(Eleventh Embodiment)

Next, the description will be directed to an embodiment which provides registers 104 and 204 for preventing asynchronism between processors P0 and P1 if a correctable internal fault has occurred, presets the information ("1") for indicating prevention of out of synchronism with an internal instruction train to the registers 104 and 204, and prevents asynchronism between the processors P0 and P1 if a correctable internal fault occurs in one of the processors.

That is, each of the processors P0 and P1 operates to fetch an instruction, decode the instruction and do the ECC check as shown in FIGS. 27A-a. If no error is detected in the ECC result, the decoded instruction is executed. If, however, the ECC result indicates a correctable error, as shown in FIGS. 27A-b, the instruction is decoded again and is executed. If the ECC result indicates a correctable error, the mismatch fault detection display signals 112 and 212 are output as correctable internal faults.

In the processor P0 or P1, hence, if the ECC result is "no" but correctable, the timing when the instruction is executed is slipped in a manner to shift both of the processors out of the synchronism with each other.

In the system where a relatively large number of correctable internal faults are expected to occur, therefore, the register 104 or 204 for preventing asynchronism is provided in the processor P0 or P1. Then, the information ("1") for indicating prevention of asynchronism is set to the registers 104 and 204. Each of the processors P0 and P1 operates to fetch an instruction, perform the ECC check about the instruction, and decode the instruction based on the ECC check result in their internal operations, as shown in FIGS. 27B-a and b. If the ECC result is "no" but correctable, the ECC is performed for correcting the instruction data and the corrected data is passed to an instruction decode section for decoding it.

Therefore, the number of processing cycles required to perform the pre-set processing if a correctable internal fault occurs is the same as that required to do the pre-set processing if it does not occur. This results in preventing out of synchronism of the processors.

(Twelfth Embodiment)

Next, the description will be directed to an embodiment which is arranged to separate a processor having a detected fixed fault, by referring to FIGS. 18 and 19. When the processors P0 and P1 detect a fixed fault, they operate to apply the fixed fault display signals 111 and 211 to the match control logic 300. The circuit 300 serves to specify the processor in which a fault occurs, switch the M/C mode if necessary, save a log in the fault log register 303, and interrupt the processors through the effect of the interrupt control circuit 400. In response to a report about a fault interrupt, the processor in the master mode operates to read the content of the fault log register 303, analyze it, and recognize the fixed fault of the checker processor P1. After the fixed fault is recognized, the match control logic 300 issues no further re-synchronizing indication so that the processor having no recognized fault may solely continue the later process. According to the present embodiment, if a fixed fault takes place in one processor, the other processor can continue the process as an emergency measure.

(Thirteenth Embodiment)

Figures 20A, 20B:
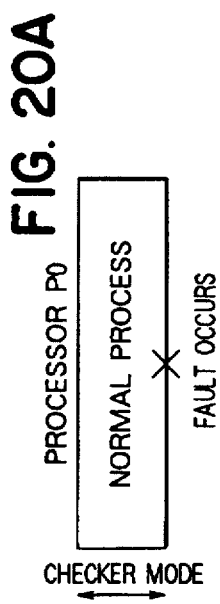
FIGS. 20 (A-B) are flowcharts showing another process for operating only the processor in the master mode.

Next, the description will be directed to another embodiment about recovering a fixed fault and which is arranged to analyze the fault based on the detailed fault log information saved in the main storage unit, not on the fault log information in the match control logic 300, by referring to FIGS. 18 and 20.

As shown in FIG. 18, the match control logic 300 further includes a mismatch fault report suppressing indicating register 301 for indicating inhibiting of an interrupt request output of a fault report against the subsequent mismatch fault if a flag is set to the register.

Then, the embodiment operates according to the processing flowchart shown in FIG. 20. The flow shown in FIG. 20 is executed when a fixed fault occurs in the processor P0 in the master mode. Like the control flow shown in FIG. 17, the operation is executed to switch the mode, analyze the fault, save the internal state, resynchronize the processors, and save the internal fault detailed log to the main storage unit. Next, the processors P0 and P1 read the detailed log information about the internal fault of the processors and analyze the information in detail. If the occurrence of the fixed fault in the processor P0 is recognized as a result of analyzing the information, the processor P1 in the master mode operates to output to the match control logic 300 an indication for setting the information for indicating fault report suppressing to the register 301 for indicating suppressing of a mismatch fault report. In response to the indication, the match control logic 300 serves to set a flag to the register 301.

That is, unlike the twelfth embodiment, the processor with a fixed fault detected continues to operate in accordance with a re-synchronizing indication. If a mismatch fault occurs later, only the processor in the master mode is allowed to be operated by ignoring the mismatch fault. The processors operate to analyze the detailed log information about faults saved in the main storage unit after re-synchronizing the processors. Hence, the fault analysis is made possible in the state that the signal lines set to the kinds of fault reports are assumed as one signal line for giving a report about whether or not a fault occurs irrespective of the kinds of faults.

(Fourteenth Embodiment)

Next, the description will be directed to an embodiment which performs a test about whether or not a fault recovering operation is normally done.

The mode display registers 103 and 203 provided in the processors P0 and P1 operating in synchronism both indicate "1" in the master mode or "0" in the checker mode. That is, the register 103 indicates a different value from the register 203. Thus, only one processor is enabled to execute an internal fault injection operation with a specially intended instruction train. This is for bringing about a mismatch state intentionally so as to test the fault recovering operation. This embodiment will be described, by referring to FIGS. 23 and 28.

The processors P0 and P1 include internal fault injection mode indication registers 105 and 205 and instruction trains for test (for generating an internal fault).

If the contents of the registers 105 and 205 are "1", the processors P0 and P1 perform the internal fault injection operation as indicated by a prepared instruction train. If the contents are "0", the processors are unable to perform the internal fault injection operation indicated by the prepared instruction train.

Figure 28:
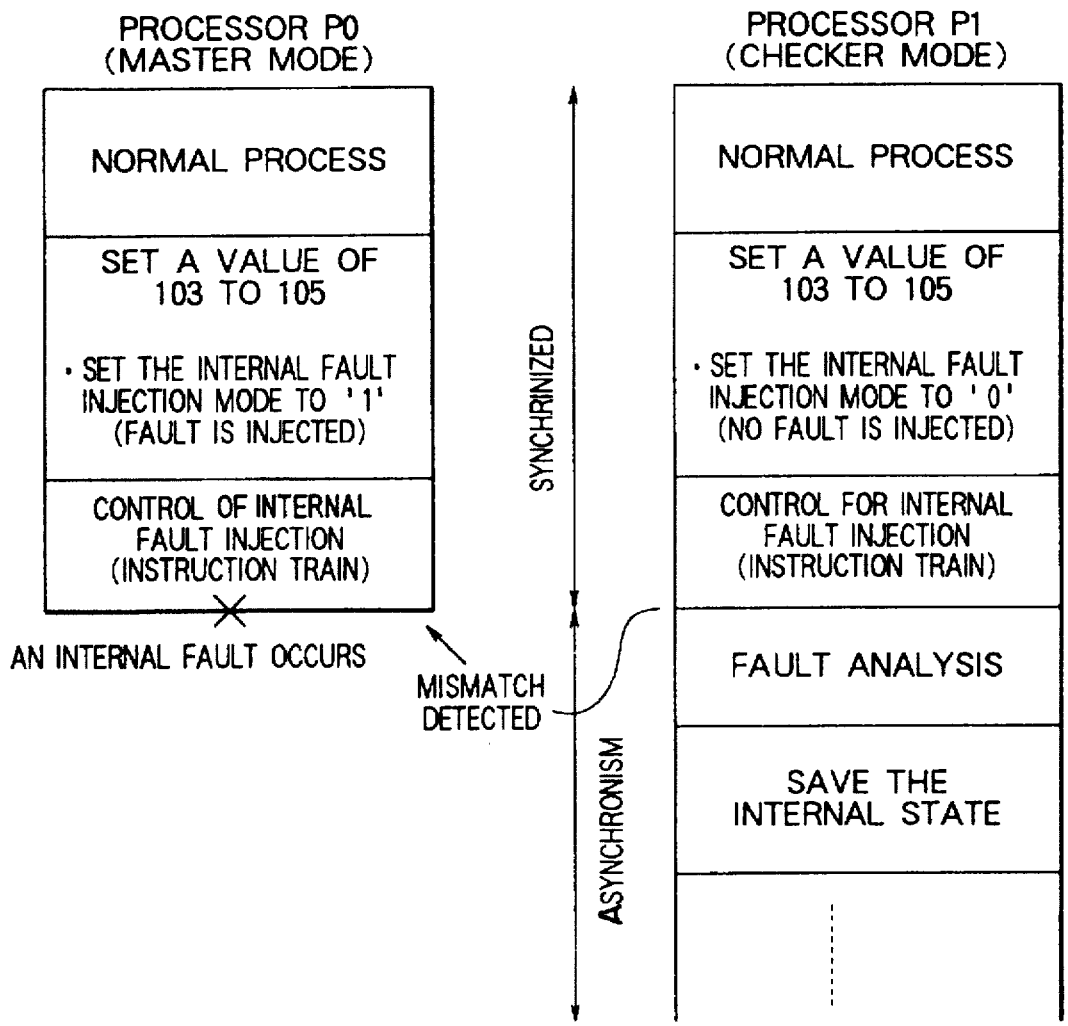
FIG. 28 is a flowchart showing a process for forcibly bringing about a mismatch state between the outputs of the processors for checking a fault detecting function.

As shown in FIG. 28, in response to an interrupt signal sent from the external at proper times when the normal processing is being done or according to the monitoring operation at time intervals, the instruction trains are inserted. The instruction train is configured to set the content of the mode display register 103 or 203 to the register 105 or 205.

In the embodiment shown in FIG. 28, since the processor P0 is in the master mode, a value of "1" is set to the mode display register 103, while a value of "0" is set to the mode display register 203 of the processor P1 in the checker mode.

In this state, the processor P0 operates to execute the instruction train for setting the inserted content of the mode display register 103 or 203 to the internal fault injection mode indication register 105 or 205 in a manner that the internal fault may be injected to only the processor P0. Then, when the processors P0 and P1 execute the instruction for accessing a portion where the internal fault is injected, only the processor P0 can detect the fault. This results in making the outputs of the processors P0 and P1 mismatched, thereby forcibly causing a mismatch state.

If the fault recovery is executed for the mismatch state intentionally generated by the instruction based on the foregoing control process, it means that the fault recovers operation is performed properly.

(Fifteenth Embodiment)

Figure 29:
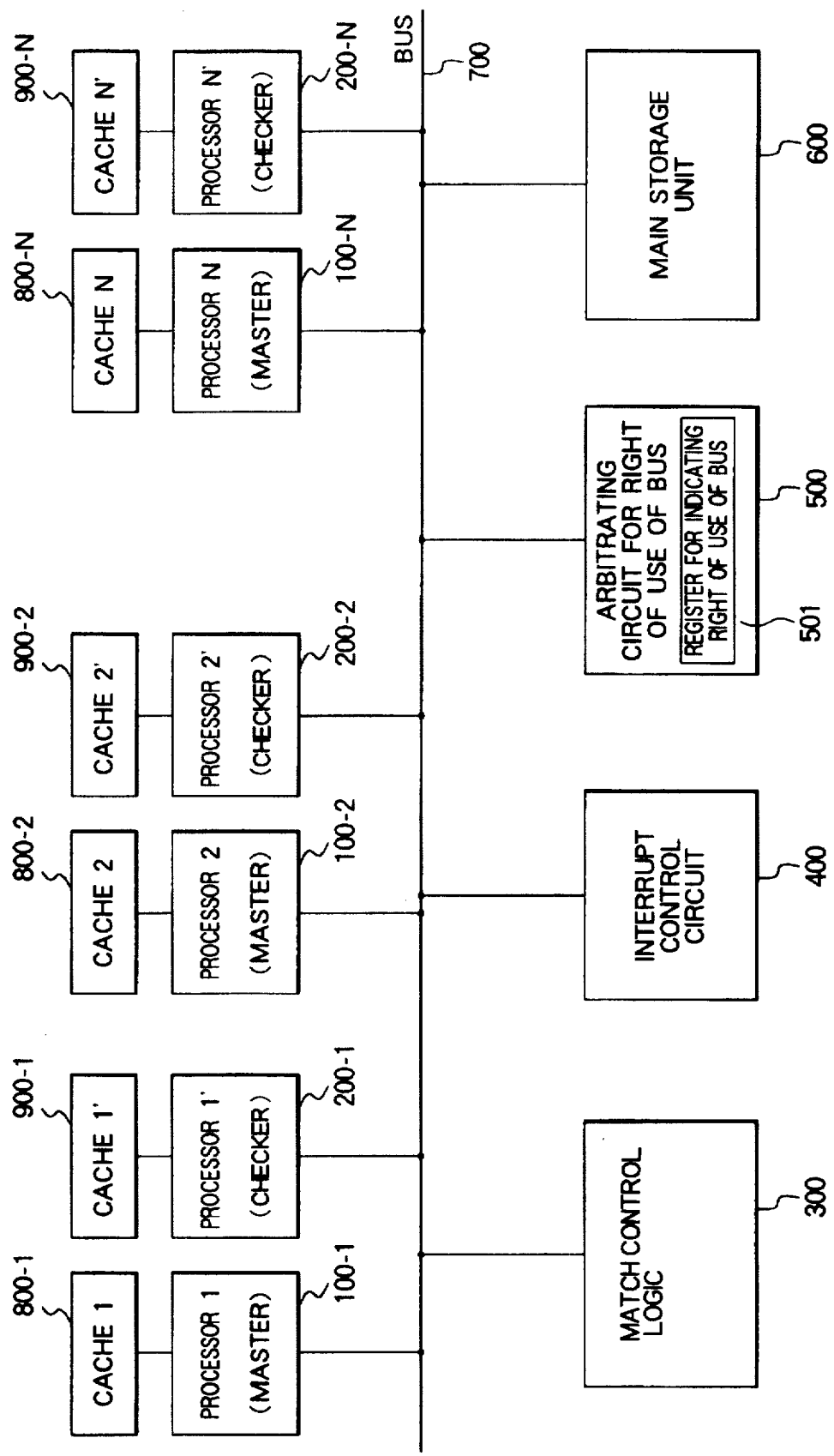
FIG. 29 is a block diagram showing an embodiment of a multi-processor system to which the present invention applies.

The description will be directed to a multiprocessor system of an embodiment which is arranged to have N pairs of processors connected on a bus 700 as referring to FIG. 29. Each pair is composed of processors K (K=1 to N) 100-1 to 100-N in the master mode, processors K'200-1 to 200-N in the checker mode, and cache memories K (800-1 to 800-N) and K' (900-1 to 900-N). The match control logic 300, the interrupt control circuit 400, the arbitrating circuit 500, and the main storage unit 600 are connected on the bus 700. These circuits 300, 400, 500 and the main storage unit 600 operate to commonly control each pair of processors.

In such a multi-processor system, to constantly make the content of the cache memory K coincide with the content of the cache memory K', if another pair of processors sends out data while the internal state is restored from the main storage unit 600 after being synchronized, the pair of processors may be shifted out of synchronism for control over the cache memories kept in respective states.

Then, a register 501 for indicating occupation of a right of use of a bus is provided in the arbitrating circuit 500 so that the information for indicating occupation of a right of use of a bus may be set to the register 501. Only the pair of processors for restoring the internal state information from the main storage unit 600 occupies the bus 700.

In this case, when the information about indicating occupation of a right of use of a bus is set to the register 501, the arbitrating circuit 500 rejects a request for a right of use of a bus from another processor.

Figure 30:
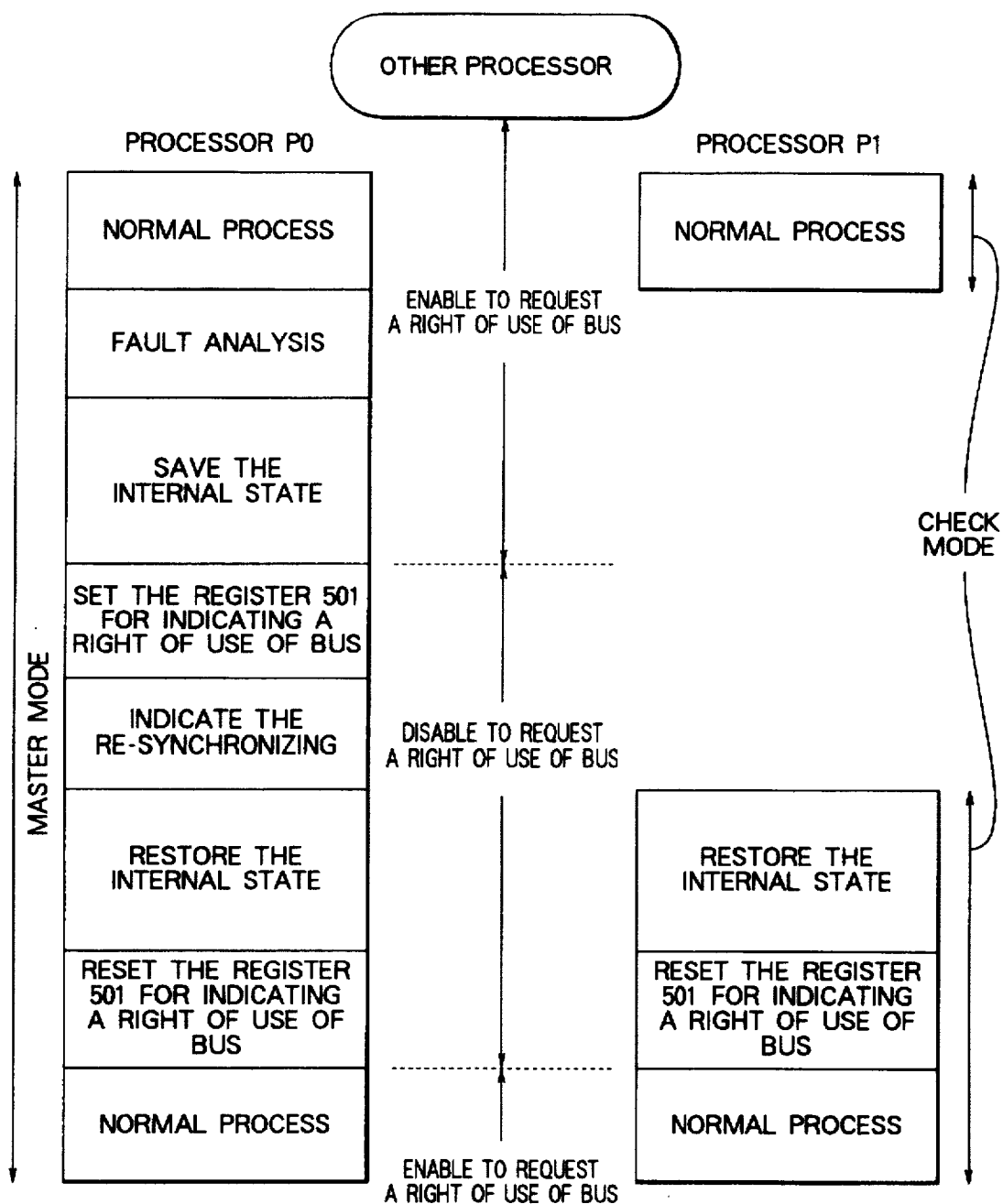
FIG. 30 is a flowchart showing the re-synchronizing process shown in FIG. 29.

FIG. 30 is a flowchart showing the process in this case. In FIG. 30, if, after the fault is analyzed, the internal state is saved in the main storage unit 600, before indicating a re-synchronizing operation, the information for indicating occupation of a right of use of a bus is set to the register 501. Then, the internal state is restored from the main storage unit 600. After the restoring operation is terminated, the register 501 is reset so as to return to the normal process.

This operation results in being able to constantly make the contents of the cache memories K and K' equal to each other.

What is claimed is:

1. A highly reliable computer system comprising:

a main memory for storing data processed by said computer system;

first and second processors connected to said main memory via a bus for executing a process in a duplex mode; and means for comparing respective outputs from said first and second processors with each other for detecting a mismatch between said outputs;

wherein each of said first and second processors includes means for detecting the internal fault occurring in said processor, one of said first and second processors serving to recognize a fault occurring in another one of said first and second processors based on fault information about the detected internal fault detected by said detecting means of said another one of said first and second processors when the mismatch is detected by said comparing means, write internal state information representing an internal status of said another one of said first and second processors in said main memory, determine a factor of the fault occurring in said another one of said first and second processors based on the fault information about the detected internal fault detected by said detecting means of said another one of said first and second processors, give a synchronizing indication to said first and second processor when said first and second processors continue the process in the duplex mode, reset said first and second processors with clock-synchronizing based on a re-executing indication in response to the synchronizing indication by an operating means, read said internal state information representing the internal status of said another one of said first and second processors saved in said main memory, and continue the process.

2. The highly reliable computer system as claimed in claim 1, wherein said first and second processors further includes a cache memory for storing part of data in said main memory and an address converting buffer integrated in said first and second processors and for storing address converting information to convert a logical address into a physical address;

wherein said cache memory includes an instruction cache memory and a data cache memory, and said detecting means provides a fault factor register whose contents include information indicating that a fault occurs in said address converting buffer, information indicating a fault occurs in said instruction cache memory, and information indicating a fault occurs in said data cache memory, and said one of the first and second processors determines the fault factor based on the content of said fault factor register.

3. The highly reliable computer system as claimed in claim 2, wherein said detecting means includes a parity check circuit for detecting if a fault occurs in said address converting buffer, said instruction cache memory, and said data cache memory, and writes information indicating occurrence of a fault to said fault factor register.

4. The highly reliable computer system as claimed in claim 2, wherein if said one of the first and second processors determines that the fault occurs in said instruction cache memory and said address converting buffer, said one of the first and second processors serves to determine whether the process can be continued in the duplex mode with said pair of processors.

5. The highly reliable computer system as claimed in claim 2, wherein both of said first and second processors includes a cache state register holding information indicating whether a state of each cache line of said data cache memory is clean or dirty and said one of the first and second processors determines that the process should be continued in the duplex mode if a fault occurs in said data cache memory and the information in said cache state register corresponding to the cache line where said fault occurs indicates that said cache line is clean.

6. The highly reliable computer system as claimed in claim 2, wherein said comparing means is held inside said first and second processors, respectively, and one of said first and second processors serves to compare the outputs of said first and second processors with each other for detecting a mismatch between said outputs.

7. The highly reliable computer system as claimed in claim 2, wherein said process for writing the internal state information of said one of the first and second processors to said main memory is performed after the process for determining a fault factor.

8. The highly reliable computer system as claimed in claim 1, wherein said computer system continues the process in the duplex mode when an internal fault occurs in at least one of said first and second processors.

9. A highly reliable computer system, comprising:

a main memory for storing data processed by said computer system;

first and second processors connected to said main memory via a bus for executing a process in a duplex mode and outputting fault information when a fault occurs, comparing means for comparing an output of said first processor with an output of said second processor for detecting a mismatch between said outputs; and match control logic connected to said first and second processors via said bus and having operating means for specifying a processor having a detected fault based on said fault information, controlling an operating mode of said first and second processors, and operating said first and second processors in synchronism with each other;

wherein said match control logic specifies within which of said first and second processors a fault occurs based on said fault information received from one of said first and second processors within which the detected fault has occurred and a mismatch between said outputs detected by said comparing means when the internal fault occurs and switch the other of said first and second processors in which no fault occurs into a master mode;

the processor in the master mode determining a factor of the fault, writes internal state information of said processor in the master mode into said main memory, and send a synchronous indication to said operating means; and said operating means outputting an operating indication to said first and second processors according to said synchronous indication for enabling said first and second processors to perform an initialization process, reading the internal state information written into said main memory and continuing a process.

10. The highly reliable computer system as claimed in claim 9, wherein each of said first and second processors includes a cache memory for storing data in said main memory and an address converting buffer integrated in said each of the first and second processors and for storing address converting information to convert a logical address into a physical address.

11. The highly reliable computer system as claimed in claim 9, further comprising a bus arbitrating circuit connected to said bus for arbitrating a right of use of said bus to said first and second processors, said first and second processors serving to output a signal for indicating occurrence of a recoverable internal fault to said bus arbitrating circuit if the detected internal fault is allowed to be recovered by said first and second processors respectively, said arbitrating circuit suppressing an output of a bus enabling signal until reception of request signals for use of said bus from said first and second processors in response to said signal for indicating occurrence of a recoverable internal fault and output said enabling signal for use of the bus to said first and second processors after reception of said request signals for use of the bus from said first and second processors.

12. The highly reliable computer system as claimed in claim 9, further comprising an interrupt control circuit connected to said first and second processors and for controlling an interrupt request to said first and second processors;

wherein said first and second processors notify said interrupt control circuit of an occurrence of a fault, and in response to said notification, said interrupt control circuit suppresses issuance of an interrupt request to said first and second processors for a subsequent interrupt request received, and issues an interrupt request to said first and second processors after receiving a signal indicating release of suppressing an interrupt request from each of said first and second processors.

13. The highly reliable computer system as claimed in claim 9, wherein said highly reliable computer system continues the process in the duplex mode if an internal fault occurs in said first and second processors.

14. A highly reliable computer system, comprising:

a main memory for storing data processed by said computer system;

first and second processors connected to said main memory via a bus and outputting fault information when a fault occurs, wherein said highly reliable computer system continues a process in a simple operating mode of one of said first and second processors with no detected fault when a fixed fault occurs in another processor of said first and second processors;

means for comparing an output of said first processor with an output of said second processor for detecting a mismatch between said outputs; and a match control logic connected to said first and second processors via said bus and for specifying a processor in which a fault occurs, based on said fault information and controlling an operating mode of said first and second processors; wherein said match control logic serving to specify in which of said first and second processors a fault occurs according to the fault information received from said faulty processor when a fixed fault occurs and a mismatch between the outputs given by said comparing means and switch the processor in which no fault occurs to a master mode, and the processor in the master mode serving to determine a factor of the detected fault and solely continue a process by itself when the fault is determined as the fixed fault of the other processor in which the fault occurs.

15. The highly reliable computer system as claimed in claim 14, wherein said first and second processors provides a cache memory for storing data in said main memory and an address converting buffer integrated in said first and second processors and for storing address converting information to convert a logical address into a physical address.

16. A highly reliable computer system, comprising:

a main memory for storing data processed by said computer system;

first and second processors connected to said main memory via a bus for executing a process in a duplex mode, having a register for indicating an operating mode state of the corresponding processor and a series of instructions for generating an internal fault and for outputting fault information when a fault occurs, wherein said highly reliable computer system continues the process in the duplex mode when an internal fault occurs in said first and second processors;

means for comparing an output of said first processor with an output of said second processor for detecting a mismatch between the output data; and a match control logic connected to said first and second processors via said bus and having operating means for specifying the processor in which a fault occurs, based on the fault information, controlling an operating mode of said first and second processors, and operating said first and second processors in synchronism with each other;

said match control logic specifies the processor in which a fault occurs based on the fault information received from said faulty processor and a mismatch between the outputs given by said comparing means when an internal fault occurs and switch the other processor in which no fault occurs into a master mode;

one of said first and second processors which operates in a master mode serving to execute said series of instructions based on information in the operating mode indicating register in response to a test execution indication.

17. The highly reliable computer system as claimed in claim 16, in which said first and second processors includes a cache memory for storing data in said main memory and an address converting buffer integrated in said the first and second processors and for storing address converting information to convert a logical address into a physical address.

18. A highly reliable computer system, comprising:

a main memory for storing data processed by said computer system;

first and second processors connected to said main memory via a bus for executing a process in a duplex mode; and means for comparing respective outputs from said first and second processors with each other for detecting a mismatch between said outputs;

wherein each of said first and second processors includes means for detecting an internal fault occurring in respective ones of said first and second processors, and wherein one of said first and second processors recognizes that a fault has occurred in another one of said first and second processors based on fault information representing a type of internal fault that has served in said another one of said first and second processors, said internal fault being detected by said detecting means of either said first and second processors when a mismatch is detected by said comparing means, and determines a factor which caused the fault based on said fault information of the internal fault detected by said detecting means of said first or second processor.

19. A highly reliable computer system, comprising:

a main memory for storing data processed by said computer system;

first and second processors connected to said main memory via a bus for executing a process in a duplex mode, wherein each of said first and second processors includes means for outputting fault information when a fault has occurred;

comparing means for comparing an output of said first processor with an output of said second processor for detecting a mismatch between the respective outputs of said first and second processors; and match control logic connected to said first and second processors via said bus and having operating means for specifying either of said first and second processors having a fault detected therein based on said fault information and for controlling an operating mode of both of said first and second processors, wherein said match control logic specifies within which of said first and second processors the detected fault has occurred based on said fault information received from one of said first and second processors within which the detected fault has occurred and a mismatch between the respective outputs of said first and second processors detected by said comparing means when the internal fault has occurred, and wherein one of said first and second processors in which no fault has occurred determines a factor of the fault based on a result specified by said match control logic.

20. A method for fault recognition within a highly reliable computer system, comprising the steps of:

storing data processed by said computer system in a main memory;

executing a process in a duplex mode in first and second processors included in said computer system;

comparing outputs of said first and second processors for detecting a mismatch between said outputs;

detecting within at least one of said first and second processors an internal fault occurring in the one of said first and second processors based on results of said comparing step;

recognizing a fault occurring in another one of said first and second processors based on fault information about the detected internal fault when the mismatch is detected in said comparing step;

writing internal state information representing a type of said another one of said first and second processors in which said internal fault has occurred in said main memory;

determining a factor of the fault occurring in said another one of said first and second processors based on the fault information about the detected internal fault detected by said detecting step;

providing a synchronizing indication when processing continues in said first and second processors;

resetting said first and second processors with clock-synchronizing based on a re-executing indication output in response to the synchronizing indication;

reading the internal state information saved in said main memory; and continuing the processing.

21. A method for fault recognition within a highly reliable computer system, comprising the steps of:

storing data processed by said computer system in a main memory;

executing a process in a duplex mode in first and second processors included in said computer system;

outputting fault information when a fault occurs;

comparing outputs of said first and second processors for detecting a mismatch between said outputs;

specifying a processor having a detected fault based on said fault information;

controlling an operating mode of both of said first and second processors; and operating said first and second processors in synchronism with each other;

wherein said specifying step comprises the steps of:

specifying in which of said first and second processors a fault occurs based on said fault information received from one of said first and second processors within which the detected fault has occurred and a mismatch between said outputs detected by said comparing step when the internal fault occurs, switching the other of said first and second processors in which no fault has occurred into a master mode, within the processor in the master mode, determining a factor of the fault, writing internal state information of said processor in the master mode into said main memory, and sending a synchronous indication for synchronous operation of said first and second processors; and outputting an operating indication to said first and second processors according to said synchronous indication for enabling said processors to perform an initialization process, read the internal state information written into said main memory and continue a process.

22. A method for fault recognition within a highly reliable computer system, comprising the steps of:

storing data processed by said computer system in a main memory;

executing a process in a duplex mode in first and second processors included in said computer system;

comparing outputs of said first and second processors for detecting a mismatch between the outputs of said first and second processors;

detecting, within at least one of said first and second processors, an internal fault occurring in the one of said first and second processors;

recognizing that a fault has occurred in one of said first and second processors based on fault information representing a type of internal fault that has occurred in said one of said first and second processors when a mismatch is detected between the outputs of said first and second processors; and determining a factor of the fault based on the fault information of the internal fault.

23. A method for fault recognition within a highly reliable computer system, comprising the steps of:

storing data processed by said computer system in a main memory;

executing a process in a duplex mode in first and second processors included in said computer system;

outputting fault information representing a type of internal fault that has occurred in one of said first and second processors, when a fault has occurred;

comparing outputs of said first and second processors for detecting a mismatch;

specifying processors having a fault detected therein based on said fault information; and controlling an operating mode of both of said first and second processors;

wherein said specifying step comprises the steps of:

specifying which of said first and second processors the detected fault has occurred in based on the fault information received from said one of said first and second processors within which the detected fault has occurred and a mismatch between said outputs of said first and second processors detected by said comparing step when the internal fault has occurred, and determining a factor of the fault.

24. A processor in a highly reliable computer system comprising a main memory for storing data processed by said computer system and a plurality of said processors connected to said main memory via a bus for executing a process in a duplex mode said processor comprising:

means for comparing outputs of said processor with an output of another processor of said plurality of processors to detect a mismatch between said outputs;

means for detecting an internal fault occurring in said processor;

means for outputting fault information when an internal fault is detected by said detecting means; and means for recognizing that an internal fault has occurred on said another processor of said plurality of processors based on said fault information of said internal fault output by said another processor of said plurality of processors, when a mismatch is detected by said comparing means.

25. The processor in a highly reliable computer system as claimed in claim 24, wherein said recognizing means including means for writing internal state information of said processor in said main memory.

26. A processor in a highly reliable computer system comprising a main memory for storing data processed by said computer system and a plurality of processors connected to said main memory via a bus for executing a process in a duplex mode, comprising:

means for clock-synchronizing with another processor of said plurality of processors;

means for detecting an internal fault occurring in said processor;

means for outputting fault information when an internal fault is detected by said detecting means; and means for recognizing that an internal fault has occurred on said another processor of said plurality of processors and writing internal state information of said processor in said main memory, in response to a signal indicating out of said clock-synchronization with said another processor of said plurality of processors.

* * * * *